United States Patent
Nakamura

(10) Patent No.: US 7,167,152 B2
(45) Date of Patent: Jan. 23, 2007

(54) OPTOELECTRONIC-DEVICE SUBSTRATE, METHOD FOR DRIVING SAME, DIGITALLY-DRIVEN LIQUID-CRYSTAL-DISPLAY, ELECTRONIC APPARATUS, AND PROJECTOR

(75) Inventor: Junichi Nakamura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 186 days.

(21) Appl. No.: 10/663,813

(22) Filed: Sep. 17, 2003

(65) Prior Publication Data

US 2004/0156246 A1 Aug. 12, 2004

(30) Foreign Application Priority Data

Sep. 18, 2002 (JP) ............................. 2002-271474
Jul. 3, 2003 (JP) ............................. 2003-191160

(51) Int. Cl.
  *G09G 3/36* (2006.01)
  *G09G 5/00* (2006.01)
(52) U.S. Cl. ............................ 345/98; 345/96; 345/209
(58) Field of Classification Search ................. 345/87, 345/89, 90, 92, 94–96, 98–100, 204–206, 345/208–210, 690, 697
See application file for complete search history.

(56) References Cited

U.S. PATENT DOCUMENTS

| | | | | |
|---|---|---|---|---|
| 5,471,225 A | * | 11/1995 | Parks ........................... | 345/98 |
| 5,712,652 A | * | 1/1998 | Sato et al. ..................... | 345/90 |
| 5,798,746 A | * | 8/1998 | Koyama ....................... | 345/98 |
| 5,952,991 A | * | 9/1999 | Akiyama ...................... | 345/98 |
| 5,977,940 A | * | 11/1999 | Akiyama et al. ............. | 345/94 |
| 6,559,821 B1 | * | 5/2003 | Ichikawa et al. ............. | 345/92 |
| 6,563,480 B1 | * | 5/2003 | Nakamura .................... | 345/82 |
| 6,731,272 B1 | * | 5/2004 | Huang .......................... | 345/204 |
| 6,765,549 B1 | * | 7/2004 | Yamazaki et al. ............ | 345/80 |
| 6,801,193 B1 | * | 10/2004 | Nakamura et al. .......... | 345/204 |
| 6,876,348 B1 | * | 4/2005 | Murata et al. ................ | 345/90 |
| 6,924,824 B1 | * | 8/2005 | Adachi et al. ............. | 345/690 |
| 2002/0036625 A1 | | 3/2002 | Nakamura | |
| 2002/0060660 A1 | * | 5/2002 | Yamasaki .................... | 345/98 |

FOREIGN PATENT DOCUMENTS

| | | |
|---|---|---|
| JP | A 08-194205 | 7/1996 |
| JP | A-8-241595 | 9/1996 |
| JP | A-2001-100707 | 4/2001 |
| JP | A-2002-169517 | 6/2002 |
| KR | A 2002-0019416 | 3/2002 |

* cited by examiner

*Primary Examiner*—Bipin Shalwala
*Assistant Examiner*—Jeff Piziali
(74) *Attorney, Agent, or Firm*—Oliff & Berridge, PLC

(57) ABSTRACT

The invention provides an optoelectronic-device substrate used for a display panel to display an image with high quality and high contrast, a method of driving the substrate, a digitally-driven liquid-crystal display, an electronic apparatus, and a projector. In an optoelectronic-device substrate having a memory-cell array including a plurality of memory cells that is arranged in matrix form and digitally driven, each memory cell has an analog switch to invert the phase of data transmitted thereto, or data having an inverted phase is transmitted to the memory cell.

12 Claims, 22 Drawing Sheets

OPTOELECTRONIC-DEVICE SUBSTRATE, METHOD FOR DRIVING SAME, DIGITALLY-DRIVEN LIQUID-CRYSTAL-DISPLAY, ELECTRONIC APPARATUS, AND PROJECTOR

BACKGROUND OF THE INVENTION

1. Field of Invention

The present invention relates to an optoelectronic-device substrate, a method for driving this substrate, a digitally-driven liquid-crystal display, an electronic apparatus, and a projector.

2. Description of Related Art

Related art optoelectronic panels can be used as display, and have, for example, a liquid-crystal part between a pair of substrates bonded together via a sealing material. These optoelectronic panels have an electrode on one of the surfaces of the substrates, the surfaces facing each other. A voltage according to an image to be displayed is applied on the electrode via routing wiring connected to the electrode.

In the related art, a voltage is applied on the liquid-crystal part in an analog fashion. In another case, a voltage was applied on the liquid-crystal part in a digital fashion every one frame or every one sub frame. (Refer to Japanese Unexamined Patent Application Publication No. 2001-100707, for example.) Further, after a positive effective voltage is applied on the liquid-crystal part, a negative effective voltage with magnitude substantially the same as that of the positive effective voltage is applied so as to prevent electrical charges from being accumulated in liquid-crystals molecules. Subsequently, electrical charges remaining in the liquid-crystal part are cancelled.

SUMMARY OF THE INVENTION

However, it is difficult to cancel electrical charges completely in the case where a positive voltage and a negative voltage are applied every one frame in the analog fashion or the digital fashion. Therefore, with the passage of time, electrical charges are accumulated in the liquid-crystal part. Subsequently, the liquid-crystal molecules deteriorate.

Further, the accumulation of the electrical charges becomes the cause of image persistence in the liquid-crystal part.

The present invention addresses or solves the above-described problems, and provides an optoelectronic-device substrate used for a display panel that can be display an image with high quality and high contrast according to a digital driving method, a method for driving this substrate, a digitally-driven liquid-crystal display, an electronic apparatus, and a projector.

In order to address or achieve the above, the present invention provides an optoelectronic-device substrate including a memory-cell array including a plurality of memory cells that is arranged in matrix form and digitally driven and a pixel electrode to retrieve pixel data stored in the memory cells as an electrical signal. In this case, each of the memory cells has a phase-inversion circuit to invert the phase of transmitted pixel data, or a data-inversion signal whose phase is inverted by the phase-inversion circuit is transmitted to the pixel electrode. Subsequently, it becomes possible to cancel an electrical charge remaining in a liquid-crystal layer or the like in the memory cell. Further, it becomes possible to display an image with high quality and high contrast through the digital-driving method.

Further, according to a preferred mode of the present invention, each of the memory cells comprises a storage unit to store the pixel data, a first analog switch to generate the data-inversion signal, based on the phase-inversion signal, and a second analog switch to switch between the data-inversion signal from the first analog switch and a zero-data signal. The data-inversion signal may preferably be selected when the pixel data is stored in the storage unit and the zero-data signal may preferably be selected when the pixel data is not stored in the storage unit. Therefore, since the memory cell has the data-inversion function, the driving capability of a phase-inversion-signal shift driver that will be described below can be reduced.

Further, according to another preferred mode of the present invention, the storage unit may preferably be formed as an SRAM. Subsequently, it becomes possible to reliably hold data in a digital fashion.

Further, according to another preferred mode of the present invention, the memory-cell array may preferably include a plurality of first signal lines for connect one group of address terminals included in one group of the memory cells in parallel, the one group of the memory cells being provided along a row direction, a plurality of second signal lines to connect one group of data terminals included in one group of the memory cells in parallel, the one group of the memory cells being provided along a column direction, and a plurality of third signal lines to connect one group of phase-inversion terminals included in one group of the memory cells in parallel, the one group of the memory cells being provided along the row direction or the column direction. Further, the optoelectronic-device substrate may preferably further comprise a first driver circuit for transmitting address signals in sequence to the memory cells via the plurality of first signal lines, the memory cells being provided along the row direction, a second driver circuit for transmitting the pixel data to the memory cells at one time via the plurality of second signal lines, the memory cells being provided along the column direction, and a third driver circuit for transmitting phase-inversion signals to each group of the memory cells via the plurality of third signal lines, the group of the memory cells being provided along the row direction or the column direction. Accordingly, it becomes possible to store two-dimensional data, such as image data, in the plurality of memory cells.

Further, according to another preferred mode of the present invention, the third driver circuit has a phase-inversion circuit to invert the phase of the pixel data, and the phase-inversion circuit inverts the phase of the pixel data before the pixel data is transmitted to the memory cells. Subsequently, it becomes possible to reduce the number of transistors forming each memory cell, whereby the size of each pixel is reduced.

Further, according to another preferred mode of the present invention, the memory-cell array comprises a plurality of first signal lines for connecting one group of address terminals included in one group of the memory cells in parallel, the one group of the memory cells being provided along a row direction, a plurality of second signal lines to connect one group of data terminals included in one group of the memory cells in parallel, the one group of the memory cells being provided along a column direction, and a plurality of third signal lines to connect one group of phase-inversion terminals included in one group of the memory cells in parallel, the one group of the memory cells being provided along the row direction or the column direction. The optoelectronic-device substrate may further comprise a row-address-decoder driver circuit for transmitting row-address data for selecting any of rows of the memory cells via the plurality of first signal lines, the memory cells being provided along the row direction or a column-address-decoder driver circuit for transmitting column-address data for selecting any of columns of the memory cells via the plurality of second signal lines, the memory cells being provided along the column direction, and the pixel data output to the memory cells designated by the row-address data and the column-address data, and a phase-inversion driver circuit to transmit a phase-inversion signal to each group of the memory cells via the plurality of third signal lines, the each group of the memory cells being provided along the row direction or the column direction. According to this configuration, it becomes possible to select a predetermined memory cell at the intersection of any row and any column by using the row-address data to selecting any rows of the memory cells and the column-address data for selecting any of columns of the memory cells. Further, it becomes possible to rewrite the pixel data of the selected arbitrary memory cell on a random basis, irrespective of the arrangement of the memory cells. As a result, it becomes unnecessary to transfer pixel data to be displayed to the memory cells whose pixel data needs not to be rewritten. Subsequently, the power consumption required for the data-rewriting operation decreases. Consequently, it becomes possible to reduce the power consumption required for an image-display device, such as a digitally-driven liquid-crystal display, an electronic apparatus, a projector, and so forth, the image-display device using the above-described optoelectronic-device substrate.

Further, according to another preferred mode of the present invention, the phase-inversion driver circuit has a phase-inversion circuit to invert the phase of the pixel data. The phase-inversion driver circuit may preferably invert the phase of the pixel data in a predetermined cycle regardless of the number of the memory cells whose display information is rewritten according to the pixel data. For example, in the case of a liquid-crystal display including the optoelectronic-device substrate is used, it becomes possible to perform operations to refresh display data applied on a liquid-crystal layer of the liquid-crystal display That is to say, it becomes possible to perform the refreshing operation (phase-inversion process) with cycles according to the liquid-crystal performance regardless of whether or not the pixel data to be displayed is changed. In the case where the liquid-crystal display displays a still image, the refreshing operation (the phase-inversion operation), which is necessary to display a moving image, can be omitted. Subsequently, it becomes possible to reduce or prevent image persistence on the liquid crystal by performing a minimum of the refreshing operation according to the performance of the liquid crystal. Consequently, it becomes possible to reduce the power requirements of an image-display device, such as a digitally-driven liquid-crystal display, an electronic apparatus, a projector, and so forth, the image-display device using the above-described optoelectronic-device substrate.

Further, the present invention provides an electronic apparatus having the above-described optoelectronic-device substrate and a display unit to display an image through the optoelectronic-device substrate. Subsequently, it becomes possible to display an image with high quality and high contrast.

The present invention provides a projector having a light-source unit to supply illumination light, the above-described optoelectronic-device substrate, a display unit to display an image by using the optoelectronic-device substrate, and a projection-lens system to project the image of the display unit. Subsequently, it becomes possible to project an image with high quality and high contrast.

According to another preferred mode of the present invention, a method to driving an optoelectronic-device substrate that includes a memory-cell array including a plurality of memory cells that is arranged in matrix form along a row direction and a column direction and that is digitally driven preferably includes a phase-inversion process of inverting the phase of the pixel data transmitted to the memory cells. Subsequently, electrical charges remaining in, for example, a liquid-crystal layer in the memory cell can be cancelled. Further, it becomes possible to display an image with high quality and high contrast by using the digital-driving method.

Further, according to preferred mode of the present invention, in the phase-inversion process, the pixel data is subjected to pulse-width modulation, one frame is divided into a plurality of sub frames, and the phase of the display data in the sub frames is preferably shifted to the plus side to the minus side with about one-half cycles. Subsequently, it becomes possible to cancel an electrical charge for reducing deterioration of liquid-crystal molecules in a liquid-crystal display panel, for example. Accordingly, image persistence in the liquid-crystal part can be prevented.

According to another preferred mode of the present invention, in the phase-inversion process, the memory cells provided along the row direction are preferably selected in sequence and the phase of the pixel data is inverted at the same time. Subsequently, it becomes possible to efficiently perform sub-frame rewriting without wasting time.

According to another preferred mode of the present invention, the phase-inversion process includes sub-frame-cycle varying process for making a cycle of the sub-frames variable through changing a cycle with which the phase-inversion signal is transmitted to the memory cells provided along the row direction and a cycle with which the pixel data is transmitted to the memory cells provided along the row direction. Subsequently, it becomes possible to arbitrarily change the cycle of the sub frames.

DETAILED DESCRIPTION OF PREFERRED EMBODIMENTS

Exemplary embodiments of the present invention are described below in detail with reference to the attached drawings.

(First Embodiment)

(Reflection Liquid-crystal Display Panel)

Figure 1:
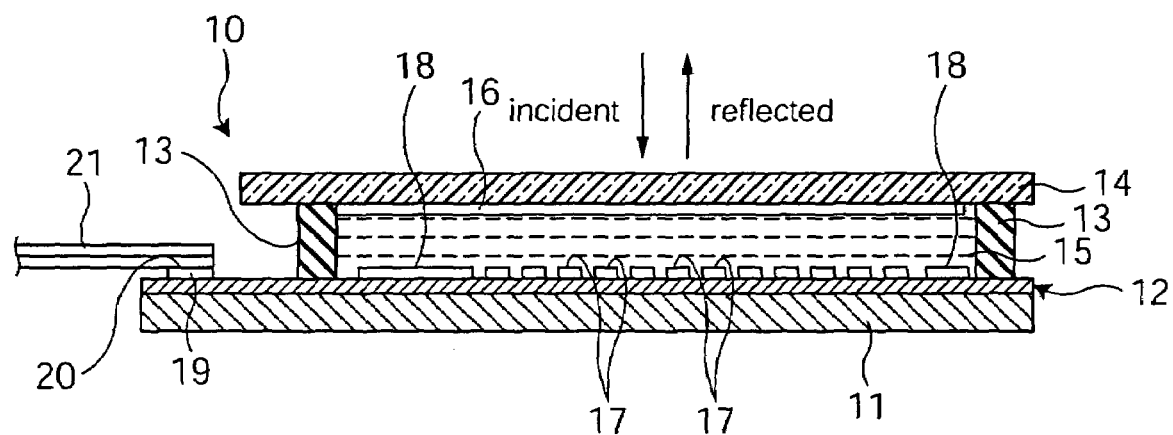
FIG. 1 shows the schematic configuration of a reflection liquid-crystal display panel according to a first embodiment of the present invention.

FIG. 1 is a sectional view of a reflection liquid-crystal display panel 10 including an optoelectronic-device substrate according to a first exemplary embodiment of the present invention. A circuit-forming layer 12 including pixel electrodes 17 is formed on a silicon substrate 11. The pixel electrodes 17 are arranged in matrix form. A transparent substrate 14 is provided so as to face the silicon substrate 11. An liquid-crystal layer 15 is formed between the silicon substrate 11 and the transparent substrate 14. The liquid-crystal layer 15 is sealed by a sealing material 13.

A counter COM electrode 16 is formed on the silicon-substrate-11 side of the transparent substrate 14. A terminal pad 19 is provided on one end of the silicon substrate 11. A flexible-tape wiring 21 is bonded to the terminal pad 19 by using an anisotropic conductive adhesive 20.

The elements of the reflection liquid-crystal display panel 10 are all formed on the circuit-forming layer 12 on the silicon substrate 11. A driving circuit to drive the pixel electrodes 17, and a row driver, a column driver, and a phase-inversion-signal shift driver that are provided near the substrate are formed near and around the pixels on the same substrate.

The reflection liquid-crystal display panel 10 has two main characteristics. One of the two main characteristics is that a voltage is applied to the liquid-crystal layer 15 in a digital fashion and a pair of voltages inverted to each other, that is, a positive voltage and a negative voltage, is applied to the liquid-crystal layer 15 in one frame (or one sub frame that is be described later). The other of the two main characteristics is that a sub-frame driving method described later is used for displaying an image and rewriting is performed for each of lines to display the lines in sequence. These characteristics will be described below in detail.

(Schematic Configuration of Optoelectronic-device Substrate)

Figure 2:
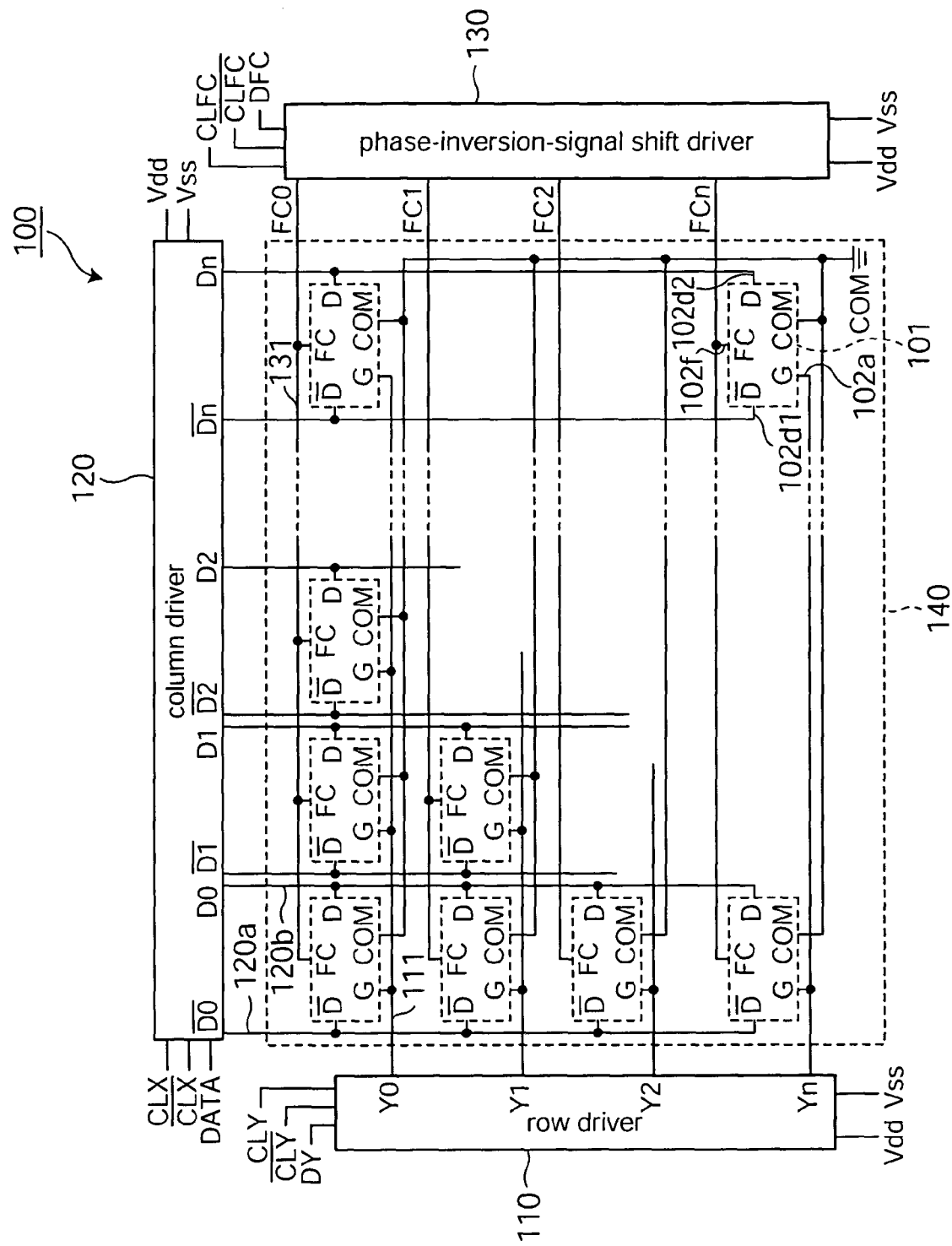
FIG. 2 shows the schematic configuration of an optoelectronic-device substrate according to the first exemplary embodiment.

FIG. 2 is a block diagram illustrating the inner configuration of the circuit-forming layer 12 including the driving circuit and the above-described drivers. The circuit-forming layer 12 has a memory-cell array (a digital storage) 140, a row driver 110, a column driver 120, and a phase-inversion-signal shift driver 130. Signals DY, DATA, and DFC are transmitted from a control circuit (not shown) to the drivers 110, 120, and 130, respectively. Further, clock signals CLY, $\overline{CLY}$CLX, $\overline{CLX}$, CLFC, $\overline{CLFC}$ are transmitted from the control circuit to the drivers 110, 120, and 130, respectively.

The logic levels of signals not having bars and those having bars are inverse of one another.

The memory-cell array 140 includes a plurality of memory cells 101 that is arranged in two-dimensional matrix form (array form) and can store image data corresponding to one screen. Each of the memory cells 101 includes a pair of data terminals 102d1 and 102d2, an address terminal 102a, a phase-inversion terminal 102f, and an output terminal (not shown).

The memory-cell array 140 includes a plurality of address lines (first signal lines) 111 that are electrically connected to the row driver (a first driver circuit) 110, a plurality of a pair of data lines (second signal lines) 120a and 120b that is electrically connected to the column driver (a second driver circuit) 120, and a plurality of phase-inversion-signal lines (third signal lines) 131 that is electrically connected to the phase-inversion-signal shift driver (a third driver circuit) 130.

The address lines 111 connect the address terminals 102a of the plurality of memory cells in parallel, the memory cells being arranged along the row direction (a first direction). The data lines 120a connect the data terminals 102d1 of the plurality of memory cells in parallel, the memory cells being arranged along the column direction (a second direction orthogonal to the first direction). Similarly, the data lines 120b connect the data terminals 102d2 of the memory cells in parallel, the memory cells being arranged along the column direction. The phase-inversion-signal lines 131 connect the phase-inversion terminals 102f of the plurality of memory cells in parallel, the memory cells being arranged along the row direction (the first direction).

(The Configuration of Memory Cell)

Figure 3A:
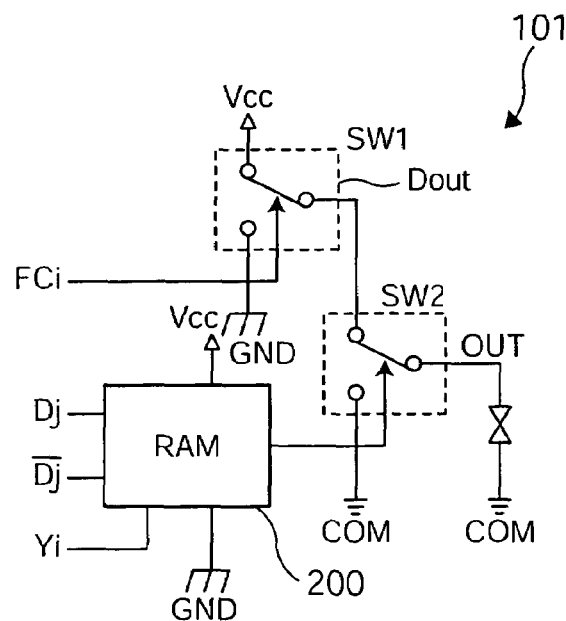
FIGS. 3A and 3B show the configuration of a memory cell according to the first embodiment.

FIG. 3A shows the schematic configuration of the memory cell 101. The memory cell 101 has a storage unit 200 and two analog switches SW1 and SW2. The storage unit 200 is formed as an SRAM for storing image-data signals DATA and $\overline{DATA}$ that are transmitted from ends Dn and $\overline{Dn}$ of the column driver 120. The first analog switch SW1 transmits a data-inversion potential Dout to the second analog switch SW2, based on a phase-inversion signal FC. The second analog switch SW2 transmits either the data-inversion potential Dout transmitted from the first analog switch SW1 or a reference potential COM to the pixel electrode 14 according to the data stored in the storage unit 200. The reference potential COM is equivalent to a potential given to the counter COM electrode 16 shown in FIG. 1. In the case where the storage unit 200 stores the image-data signal DATA, the data-inversion potential Dout is given to the pixel electrode 14. Therefore, a voltage obtained by subtracting the data-inversion potential from the reference potential COM is applied to the liquid-crystal layer 15. In the case where the storage unit 200 does not store the image-data signal DATA, the reference potential COM is given to the pixel electrode 14, whereby the difference between the potential of the pixel electrode and that of a common electrode becomes zero. In this case, no voltage is applied to the liquid-crystal layer 15.

Figure 3B:
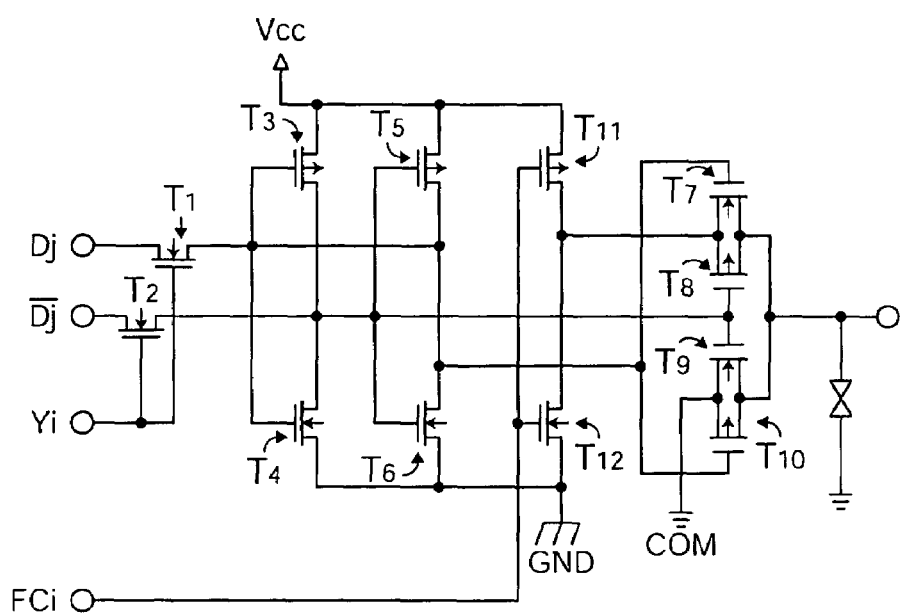

FIG. 3B illustrates transistors of the memory cell 101 for describing the configuration of the memory cell 101. Transistors T1 to T6 correspond to the storage unit 200. Transistors T7 to T10 correspond to the analog switch SW2, and transistors T11 to T12 correspond to the analog switch SW1, respectively. Since the analog switch SW1 is formed in the pixel, the driving capability of an FC line can be reduced.

Since the memory cell 101 has a memory formed as an SRAM, the column driver 120 transmits a signal $\overline{Dj}$ (Reference character j is an integer from 0 to m. Reference character m is the column number of the pixel array.) to the memory cell-array 140. Although a signal Dj may be given to the memory-cell array 140, in the case where the signals Dj and $\overline{Dj}$ are given to the memory-cell array 140, the speed of data determination increases. Therefore, the signals Dj and $\overline{Dj}$ may preferably be given to the memory-cell array 140. The memory of the memory-cell array 140 may be formed as a memory that does not require the signal $\overline{Dj}$. In this case, the column driver 120 may not output the signal $\overline{Dj}$ to the memory-cell array 140. However, in this embodiment, the memory in the memory-cell array 140 should be formed as an SRAM memory for at least the following two reasons. First, since the configuration of the SRAM memory is simple, it is easy to provide the SRAM memory for each pixel area of a spatial light modulator. Second, since the SRAM memory can operate at high speed, it is suitable for image-data processing.

(Voltage Applied to Liquid-crystal Layer)

Figure 4:
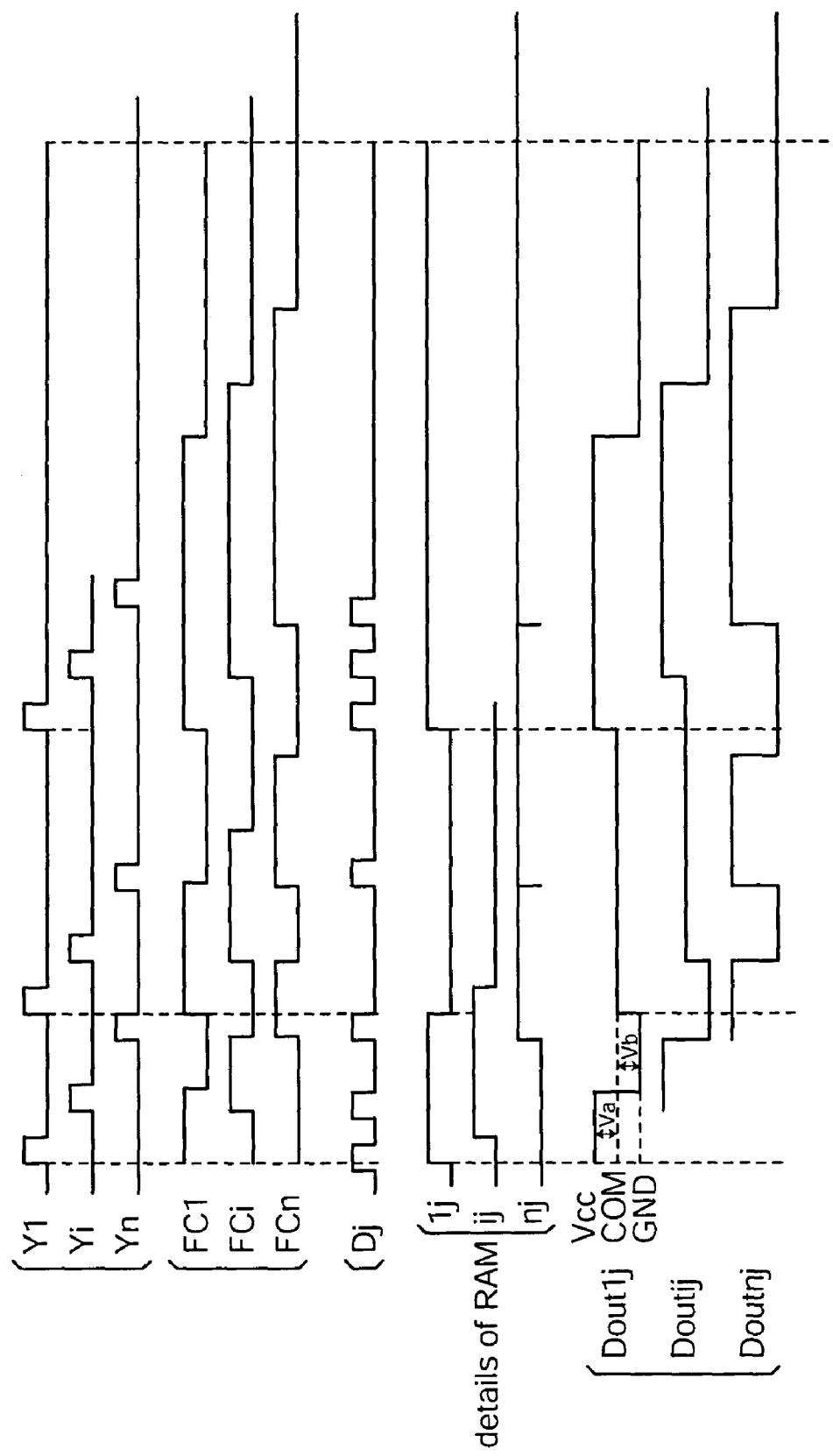
FIG. 4 illustrates a voltage applied to a liquid-crystal layer.

FIG. 4 illustrates a voltage applied to the liquid-crystal layer 15. The main object of providing FIG. 4 is to illustrate the applied voltage. The applied voltage is one of the characteristics of the present invention. The operations of the drivers 110, 120, and 130 are described in detail below. Further, the sub frame is described below. First, an address signal Yi (Reference character i is an integer from 1 to n. Reference character n is the row number of the pixel array.) from the row driver 110 is transmitted to the memory cell 101 provided along the row direction. A phase-inversion signal FCi (The reference character i is an integer from 1 to n.) from the phase-inversion-signal shift driver 130 is shifted from H level to L level, or vice versa, with one-half cycles within the sub frame. Further, the data signal Dj of the column driver 120 is transmitted according to the address signal Yi from the row driver 110.

As shown in FIG. 3A, the first analog switch SW1 generates a data-inversion potential Douti, based on the phase-inversion signal FCi. Further, the second analog switch SW2 switches between the data-inversion potential Douti transmitted from the first analog switch SW1 and the reference potential COM. Therefore, in a frame to which the data signal Di of the column driver 120 is input, a voltage is applied to the liquid-crystal layer 15. In this case, a potential given to the pixel electrode is switched between a potential Vcc and a potential GND with one-half cycles in the sub frame. The difference between the reference potential COM and the potential Vcc is equivalent to the difference between the reference potential COM and the potential GND. Therefore, a voltage that has a phase opposite to those of effective voltages Va and Vb with reference to the reference voltage COM and that has a magnitude equivalent to those of the effective voltages Va and Vb is applied to the liquid-crystal layer 15.

The liquid-crystal layer 15 performs a predetermined operation without being affected by applied voltages so long as the magnitude of the applied voltages (the effective voltages) is identical. The operation of the liquid-crystal layer 15 does not change according to whether the phase of each applied voltage is positive or negative. Further, positive voltages and negative voltages in equal proportions are applied to the liquid-crystal layer 15 in a digital fashion to produce an image display corresponding to one frame. In this case, the magnitude of each positive voltage is equivalent to that of each negative voltage. Therefore, no electrical charges remain in liquid-crystal molecules. That is to say, almost all the electrical charges are cancelled. Consequently, the electrical charges remaining in the liquid-crystal layer 15 for long time are reduced, whereby image persistence is reduced or prevented.

(Sub-frame Driving Method)

The principle of a sub-frame driving method will now be described. In the past, a voltage corresponding to the gray scale of an image was applied to the liquid-crystal layer in an analog fashion. The gray scale can be presented according to the magnitude of the applied voltage. However, in the case of the reflection liquid-crystal display panel 10 according to this exemplary embodiment, on voltages and off voltages are applied to the liquid-crystal layer 15 in the digital fashion as described above. In this case, therefore, it is impossible to present the gray scale of the image according to the magnitude of the applied voltages as in the related art. Therefore, the gray scale of the image is presented according to the sub-frame driving method using pulse-width modulation (hereinafter "PWM").

First, the sub-frame driving method will be described. For the sake of simplicity, the image is presented with eight levels of gray (three bits). In this case, one frame includes three sub frames, that is, first to third sub frames 1SF to 3SF.

Figure 5A:
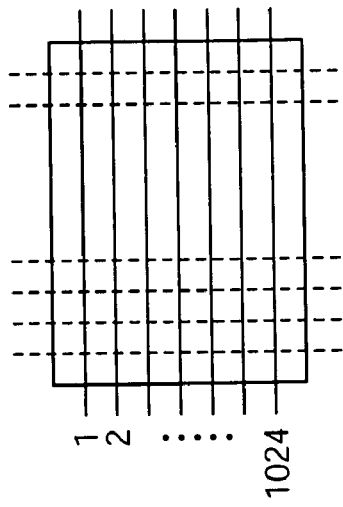
FIGS. 5A and 5B illustrate a sub-frame driving method.
Figure 5B:
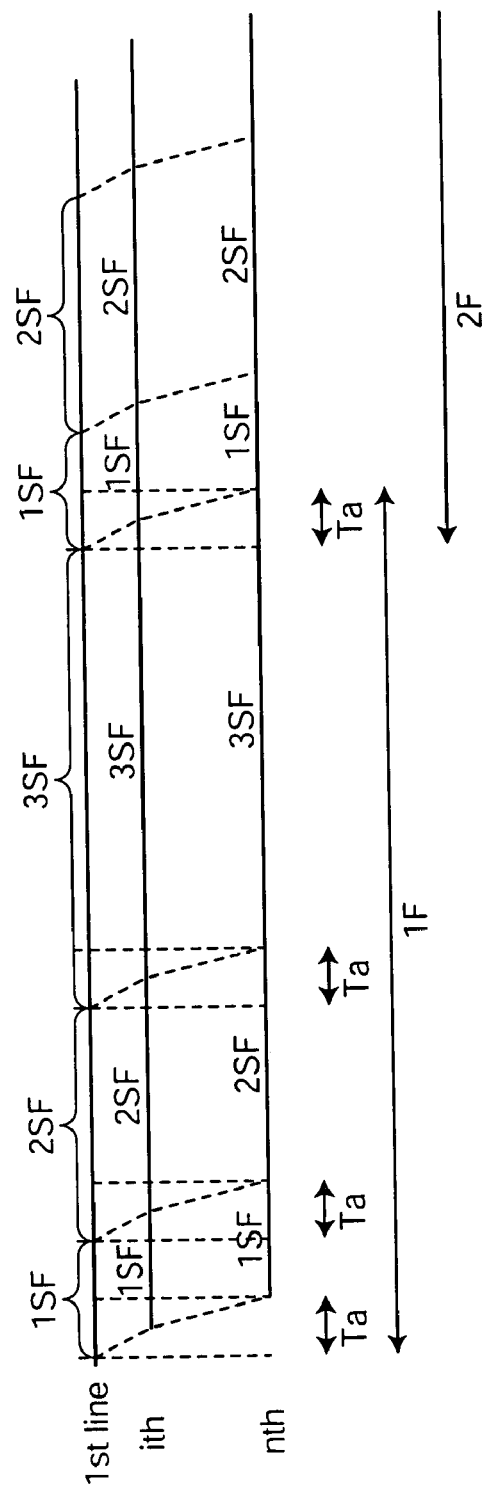

FIG. 5A illustrates the arrangement of the pixels. As shown in this drawing, an image corresponding to one frame is formed by pixels of 1024 rows. The one frame includes first to n-th lines. One sub frame includes an address period Ta for writing data to a memory cell and a display period to display the image according to the written data. In one sub-frame period, the image-data signal DATA is stored in each memory cell (a pixel) so as to be turned on when the sub frame has a weight required for displaying the frame. A method of assigning the weight to the sub frame will be described below in a description of the PWD. A time period where the image-data signal DATA is displayed corresponds to a lit state. FIG. 5B illustrates the relationship between one frame and sub frames. The one frame includes the three sub frames 1SF to 3SF. Address periods Ta of the sub frames are all the same with one another. However, display periods of the sub frames are different from one another. The number of the sub frames increases and decreases according to the number of gray levels of an image to be displayed. A sub frame corresponding to an image that is displayed for a long time, such as the sub frame 3SF, may preferably be divided. Consequently, spurious profiles are reduced, whereby the quality of the displayed image increases.

(PWM)

Figure 6A:
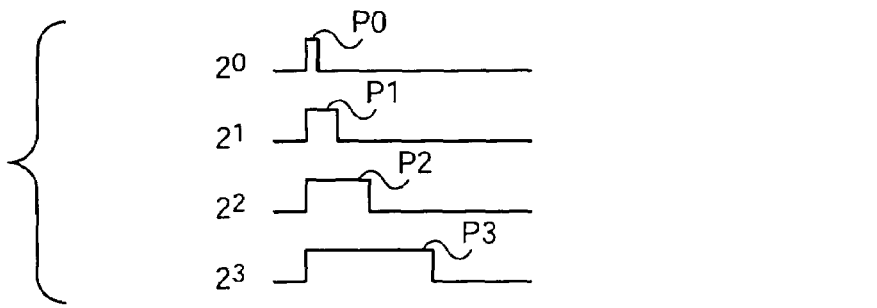
FIGS. 6A, 6B, and 6C are schematics that illustrate PWM.
Figure 6B:
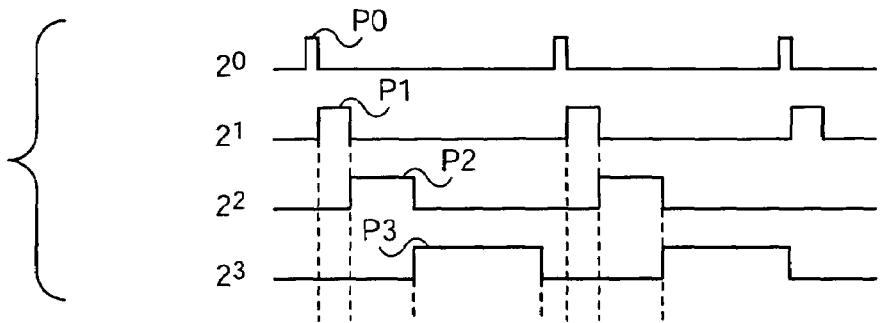
Figure 6C:
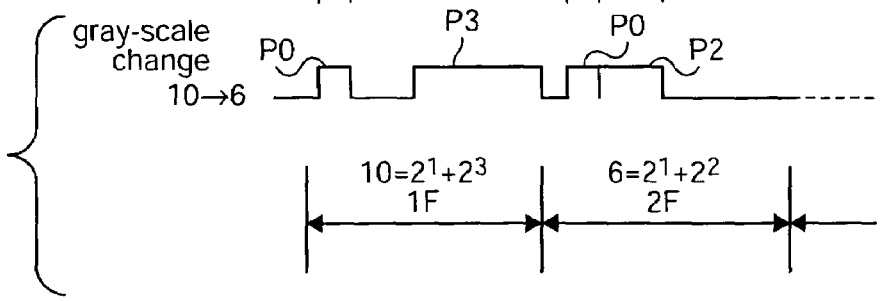

The PWM will now be described with reference to FIGS. 6A–6C. First, an example where an image is presented with sixteen gray levels (four bits) will be described. In this case, as shown in FIG. 6A, four sub-frame pulses P0 (=2⁰), P1 (=2¹), P2 (=2²), and P3 (=2³) are used, the four sub-frame pulses having weights corresponding to the bits or presenting the four-bit gray scale, respectively. FIG. 6B illustrates the timing chart of the sub-frame pulses P0, P1, P2, and P3. As shown in FIG. 6C, in the case where an image is presented with ten levels of gray, for example, the memory cell is lit in synchronization with the sub-frame pulses P1 and P3 in the one-frame display period. Consequently, the integral of the lit time in the one frame corresponds to the gray scale of the actual image to be displayed. Similarly, when the gray level of the image is changed from ten to six, the memory cell is lit in synchronization with the sub-frame pulses P1 and P2. As described above, in the case of the reflection liquid-crystal-display panel of this exemplary embodiment, the gray scale of an image to be displayed is presented according to the above-described sub-frame driving method and the above-described PWM method.

(Example Modification of Optoelectronic-device Substrate)

Figure 7:
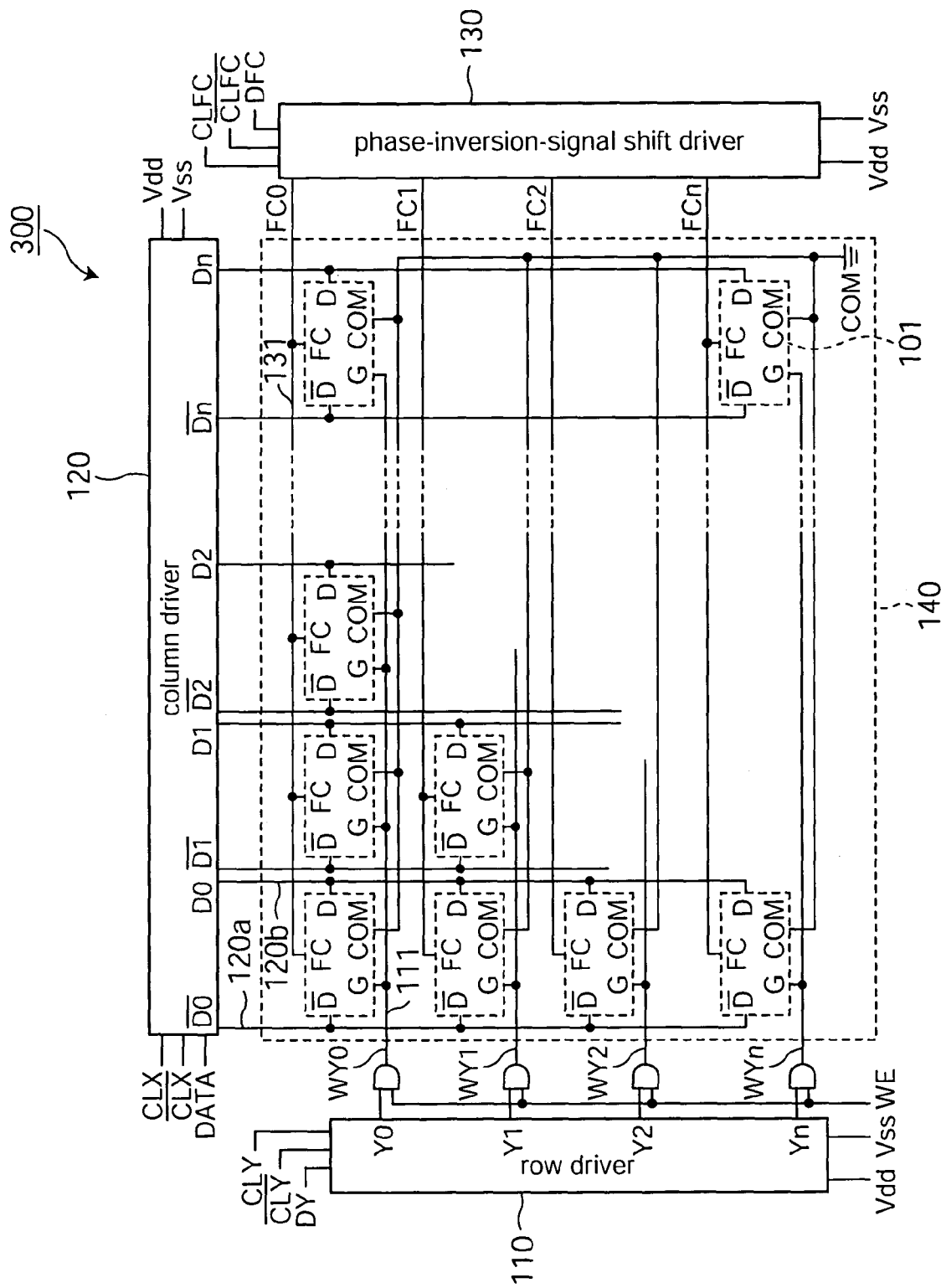
FIG. 7 shows the schematic configuration of an example modification of the optoelectronic-device substrate according to the first embodiment.

The principle of characteristic arts of the present invention, the characteristic arts being used for the optoelectronic-device substrate shown in FIG. 2, is described above. In order to adjust periods to rewrite the data signal DATA so that the rewriting periods become equal to one another, AND circuits and a signal WE may be used as shown in FIG. 7. The difference between the configuration shown in this drawing and that shown in FIG. 2 is that the AND circuits for the address signals Y transmitted from the row driver and the signal WE are added. The rest of the configuration shown in FIG. 7 is the same as that shown in FIG. 2. Therefore, the same parts are indicated by the same reference numerals and the description thereof is omitted.

The configuration and function of each driver will now be described with reference to the configuration shown in FIG. 7.

(The Configuration of Row Driver)

Figure 8:
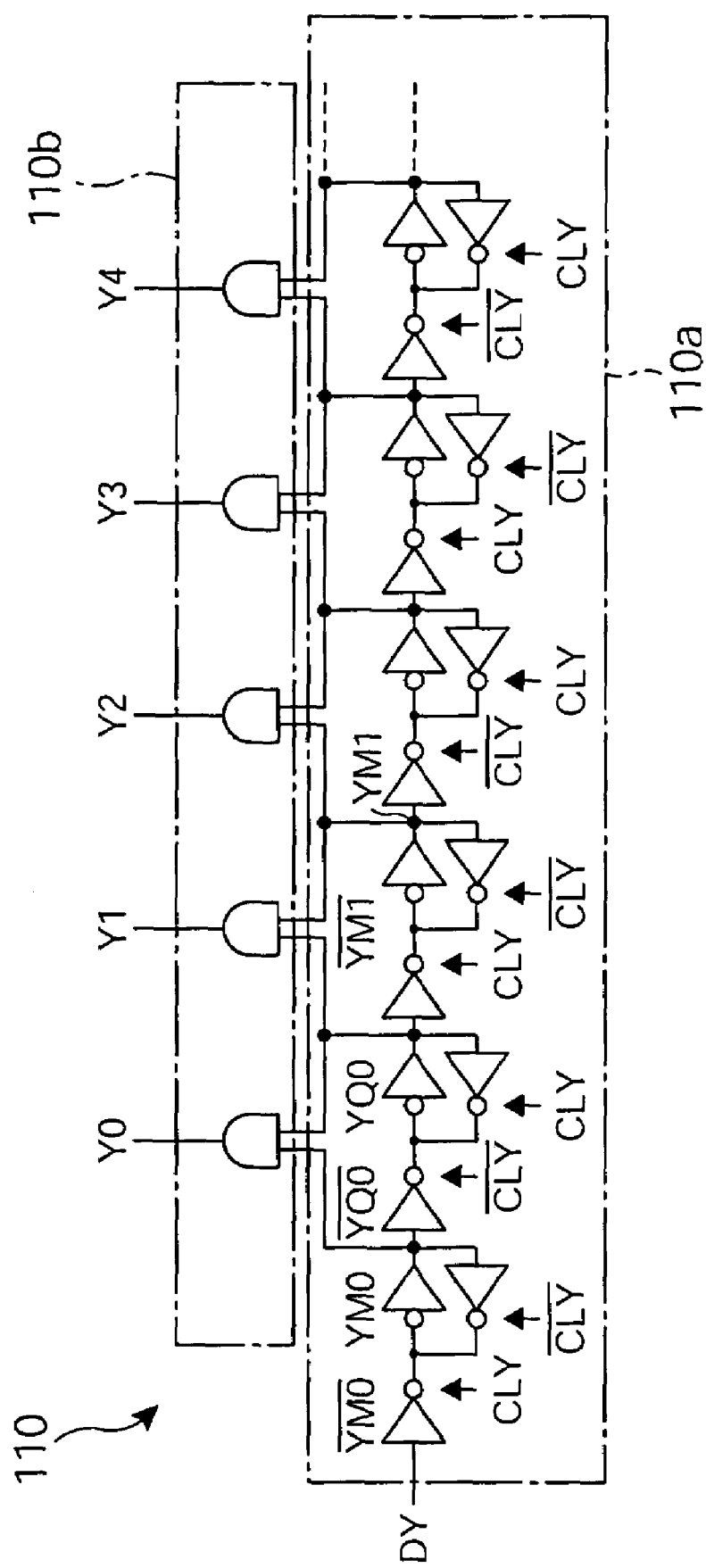
FIG. 8 shows the schematic configuration of a row driver according to the first exemplary embodiment.

FIG. 8 is a schematic illustrating an example configuration of the row driver 110. The row driver 110 transmits address signals (scan signals) Yi in sequence, from upper downward in the case of FIG. 7, to each group of the memory cells via the address lines 111, the group of memory cells being provided along the row direction.

The row driver 110 comprises a shift-register circuit 110a having a plurality of registers including three inverters and an AND-logic circuit 110b having a plurality of AND gates. The shift-register circuit 110a has the serial-parallel-conversion function. An address signal DY in pulse form is transmitted to a first register and transferred to a second register and beyond according to the clock signals CLY and $\overline{CLY}$. Further, the address signal DY is output from the registers. The AND gates of the AND-logic circuit 110b output the logical conjunction of data transmitted from two registers adjacent to each other as the address signal Yi or the like. Subsequently, the AND-logic circuit 110b outputs the address signal Yi with relatively high time resolution, that is, the address signal Yi that is shifted to H level only for a short period of time during which the address signal DY is shifted by the clock signals CLY and $\overline{CLY}$ (the one-half cycle of the clock signals CLY and $\overline{CLY}$.

(The Configuration of Column Driver)

Figure 9:
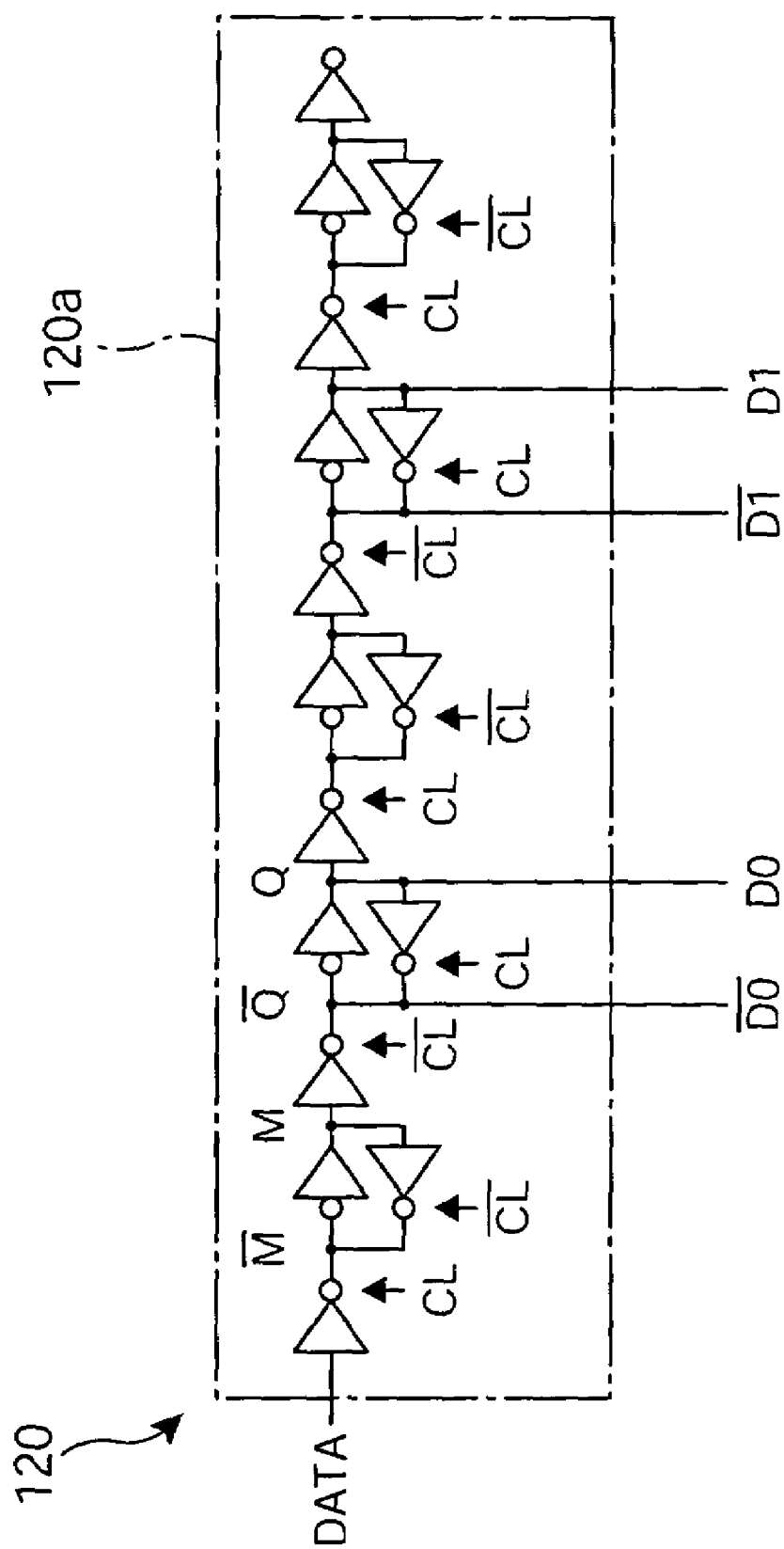
FIG. 9 shows the schematic configuration of a column driver according to the first exemplary embodiment.

FIG. 9 is a schematic illustrating an example configuration of the column driver 120. The column driver 120 transmits the pairs of data signals D and $\overline{D}$ to the groups of the memory cells at the same time via the pairs of data lines 120a and 120b, the memory-cell groups being provided along the column direction. The column driver 120 includes a shift-register circuit 120a including a plurality of registers having six inverters. The shift-register circuit 120a has the serial-parallel-conversion function. The image-data signal DATA is transmitted to the first register and transferred to the second register and beyond. Further, the image-data signal DATA is output from each register. A pair of signals Q and $\overline{Q}$ that are output corresponds to the signals D and $\overline{D}$ shown in FIG. 7.

(Timing Chart of Column Driver)

Figure 10:
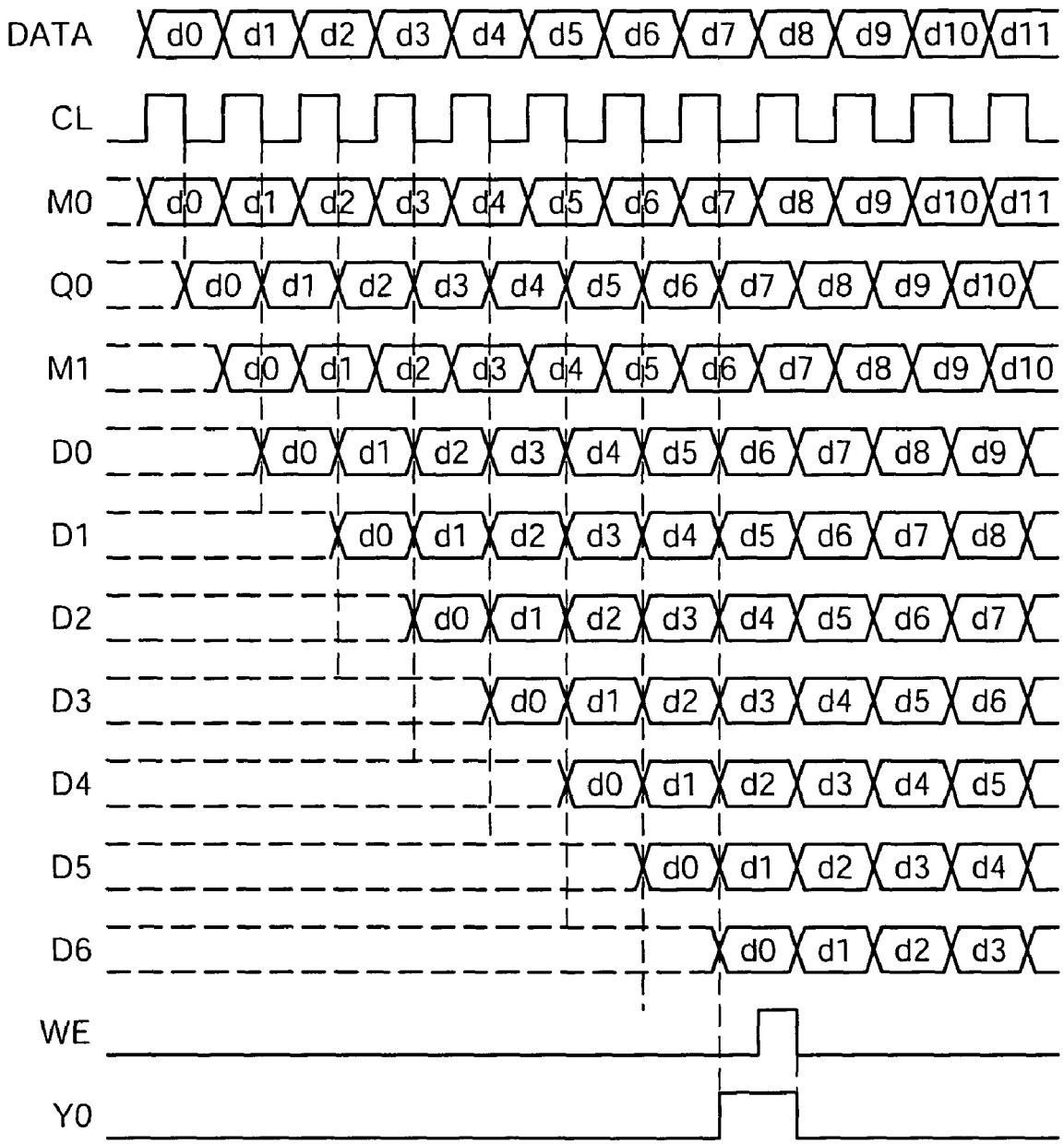
FIG. 10 is a timing chart of the column driver according to the first exemplary embodiment.

FIG. 10 shows a timing chart illustrating the operation of the column driver 120. As shown in this drawing, each register including the six inverters transfers data in sequence at the falling edge of the clock signal CL.

As described above, when the enable signal WE is at an H level, the address signals Y at the H level are transmitted to the memory cells on a predetermined row to which the data signals D and $\overline{D}$ should be transmitted.

Subsequently, each memory cell 101 can store data in the state where no crosstalk or the like is generated.

(Timing Chart of Row Driver)

Figure 11:
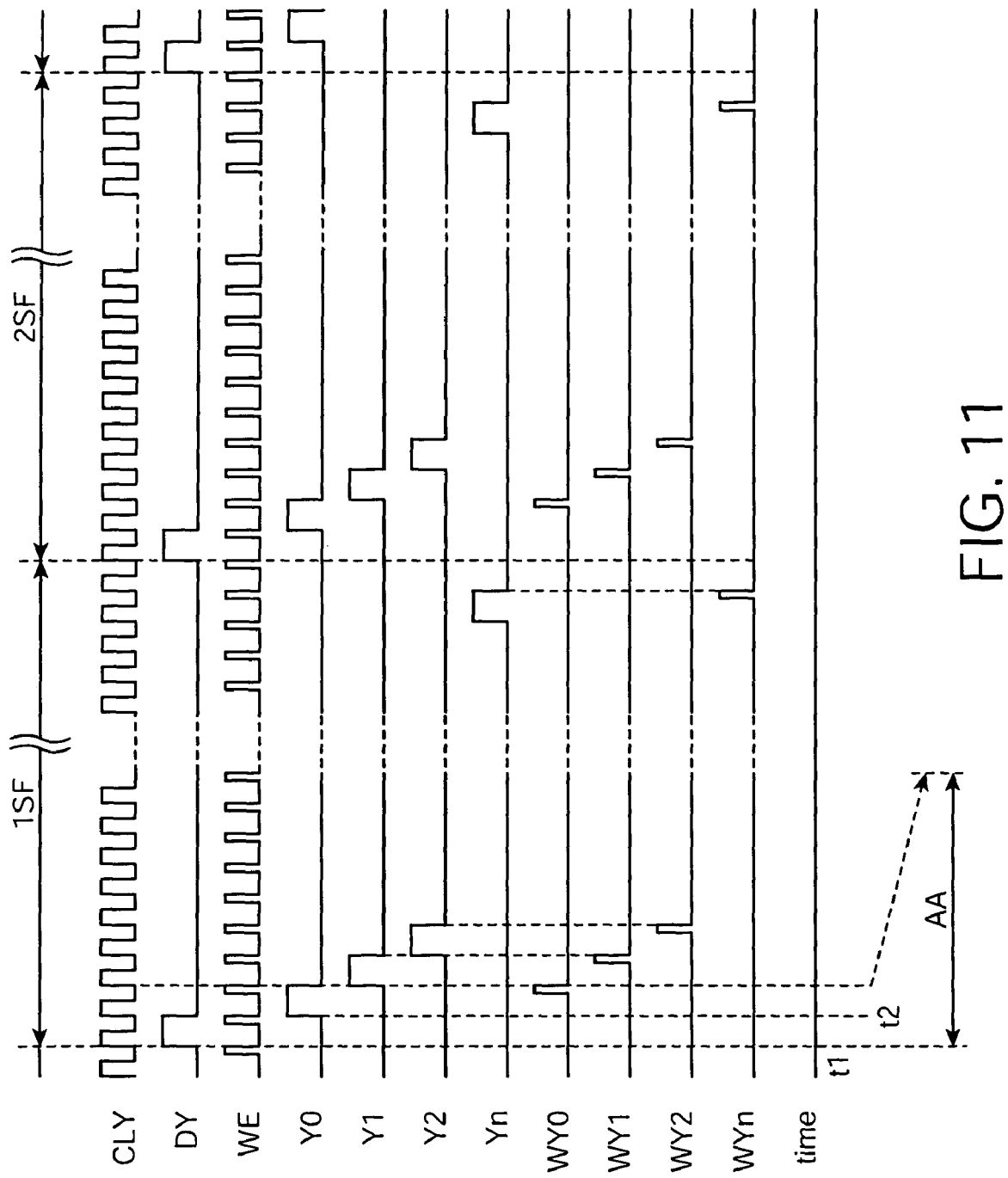
FIG. 11 is a timing chart of the row driver according to the first exemplary embodiment.
Figure 12:
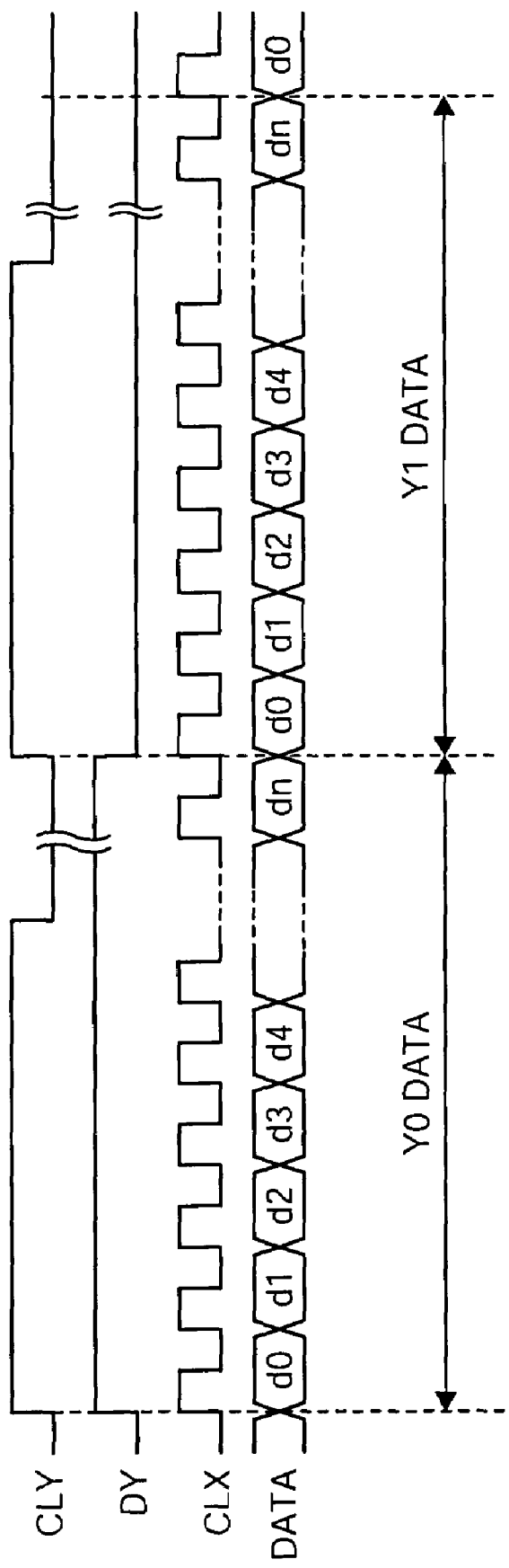
FIG. 12 is a timing chart relating to data transmission according to the first exemplary embodiment.

FIG. 11 illustrates a timing chart illustrating the operation of the row driver 110. At time t1, the address signal DY indicating that the time period of the first sub-frame 1SF is started is transmitted from the control circuit (not shown) to the row driver 110. The row driver 110 transmits the shifted address signals Yi to the memory cells 101 on each row in sequence via the plurality of address lines 111 based on the address signal DY. For example, at time t2, the address signal Y0 is transmitted to the memory cells 101 on the first row via the first address line 111. The memory cells on the first line latch the data signals D and $\overline{D}$ transmitted via the pairs of data lines 120a and 120b at the falling edge of the address signal Y0, that is, at the rise of a signal WY0. FIG. 12 shows a timing chart illustrating the timing of transmitting the image-data signals DATA according to the clock signals CLX in the row direction.

(Timing Chart Relating to Row and Column)

Figure 13:
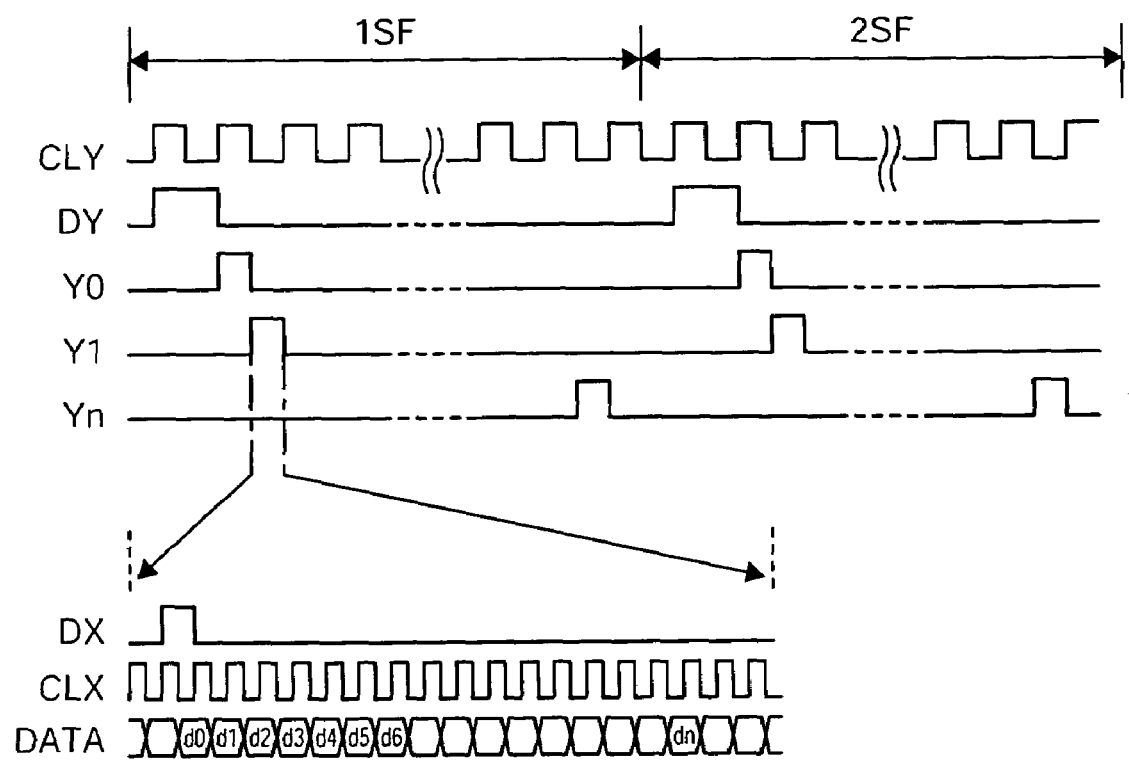
FIG. 13 is a timing chart illustrating the relationship between the row driver and the column driver according to the first exemplary embodiment.

FIG. 13 is a timing chart illustrating the relationship between the address signals DY on a predetermined row and the timing of writing the data signals DATA. For example, in the first sub frame 1SF, a predetermined row is selected by the address signal Y1 and the image-data signals DATA along the column direction are written into the memory cells 101 at the same time.

(The Configuration of Phase-inversion-signal Shift Driver)

Figure 14:
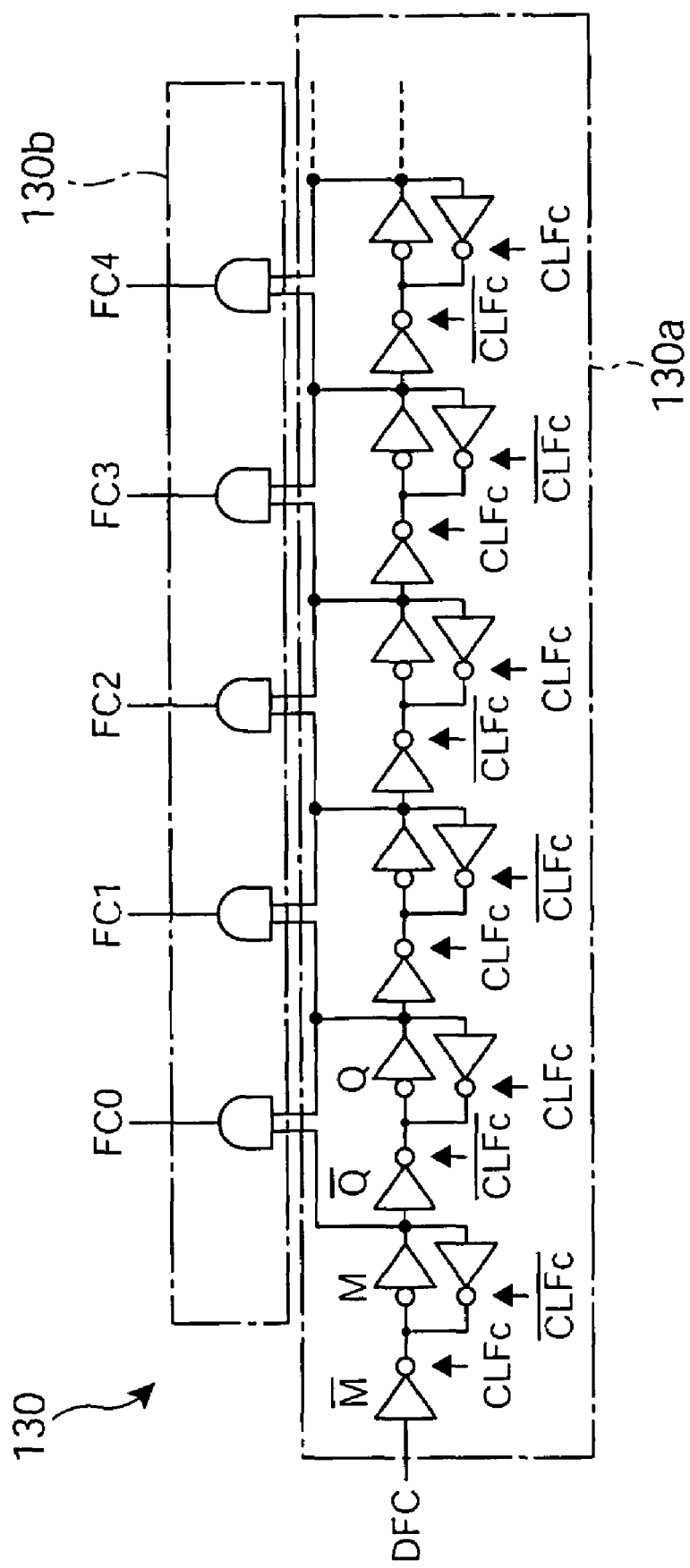
FIG. 14 shows the schematic configuration of a phase-inversion-signal shift driver according to the first exemplary embodiment.

FIG. 14 illustrates the schematic configuration of the phase-inversion-signal shift driver 130. The phase-inversion-signal shift driver 130 comprises a shift-register circuit 130a including a plurality of registers having three inverters and an AND-logic circuit 130b including a plurality of AND gates. The shift-register circuit 130a has the serial-parallel conversion function. A phase-inversion signal DFC in pulse form transmitted to the first register is transferred to the second register and beyond according to the clock signals CLFC and $\overline{CLFC}$ and output from each register. Each of the AND gates of the AND-logic circuit 130b outputs the logical conjunction of the data transmitted from the two adjacent registers as the phase-inversion signal FC0 or the like.

(Timing Chart Relating to Phase-inversion-signal Shift Driver)

Figure 15:
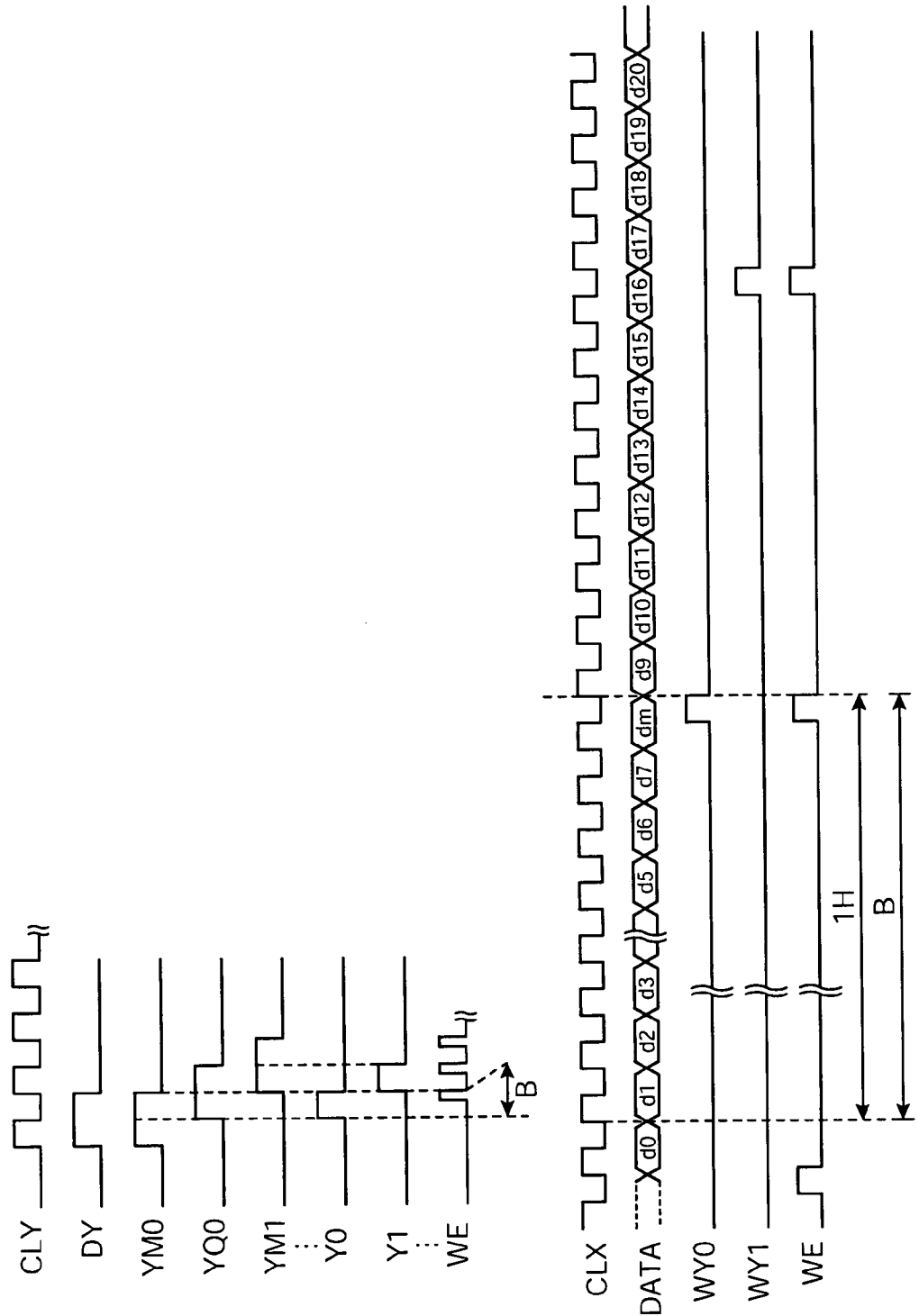
FIG. 15 is a timing chart of the phase-inversion-signal shift driver according to the first exemplary embodiment.

FIG. 15 shows a timing chart of the phase-inversion-signal shift driver. A comparison of the configuration of the row driver 110 (shown in FIG. 8) and that of the phaseinversion-signal shift driver 130 (shown in FIG. 14) clearly shows that the configuration of the row driver 110 and that of the phase-inversion-signal shift driver 130 are the same with each other. Therefore, the operation shown by the timing chart of FIG. 15 and the operation performed by the row driver 110 shown by the timing chart of FIG. 11 are identical with each other. Here, since a signal Ym0 or greater and a phase-inversion signal FCm0 or greater that are output from the shift registers correspond to the identical operations, respectively, the description thereof will be omitted.

(Timing Chart Relating to Image Display)

Figure 16:
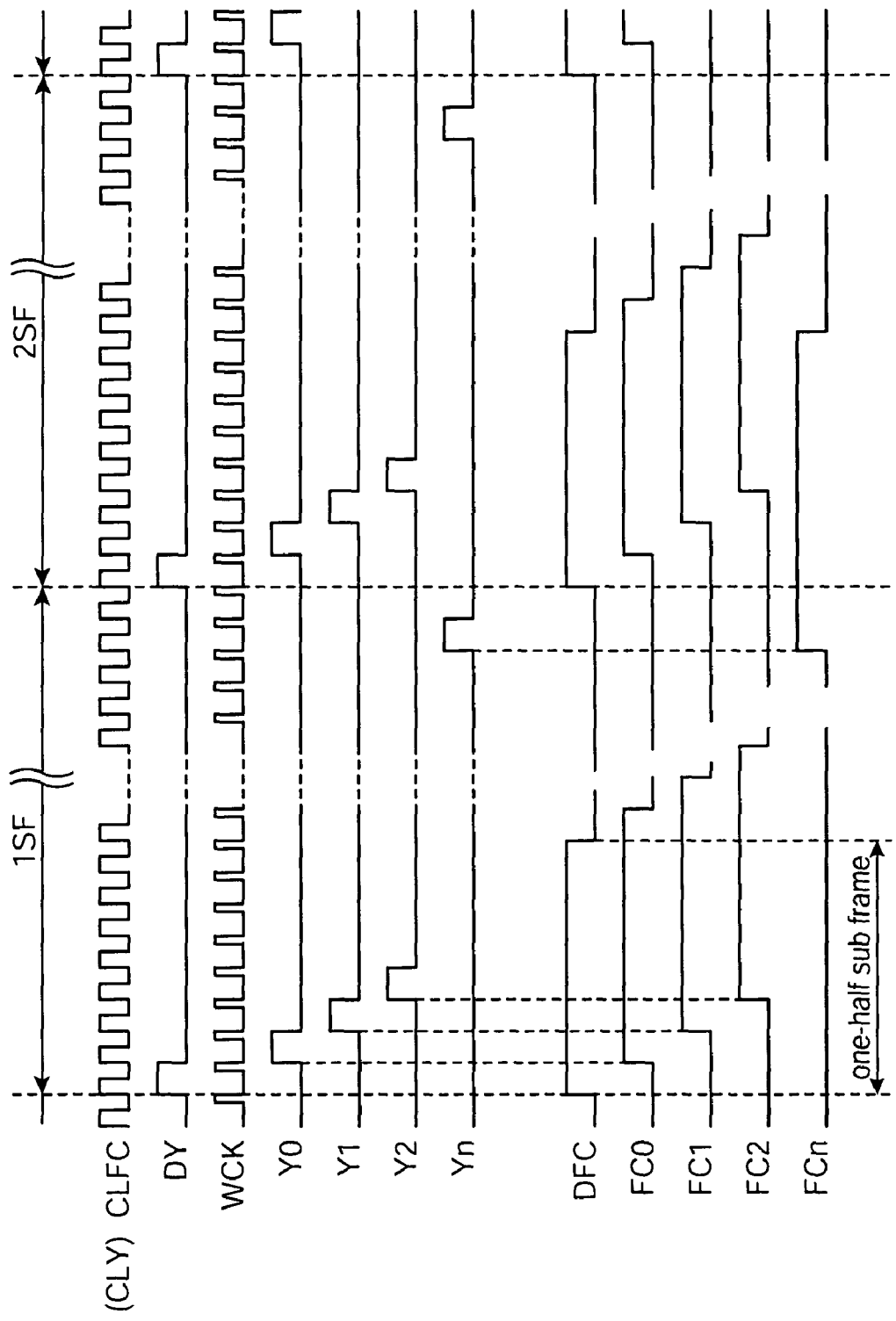
FIG. 16 is a timing chart illustrating how sub frames according to the first exemplary embodiment are displayed in sequence.

FIG. 16 shows a timing chart relating to operations performed to display an image in the case where an optoelectronic-circuit substrate 100 is used. In this drawing, the phase-inversion signal FC0 and beyond are shifted in sequence according to the address signal Yi and beyond. For example, if the time period of the second sub-frame 2SF starts on the first row, an image corresponding to the first sub-frame 1SF is displayed on the second row and beyond. According to this image-display method, it becomes possible to write continuously in the sub frames without wasting time. The cycle of the signal DFC can be changed by changing the incidence of the signal DY even though the incidence of the clock signal CLY (CLFC) is not changed.

(Second Exemplary Embodiment)

Figure 17A:
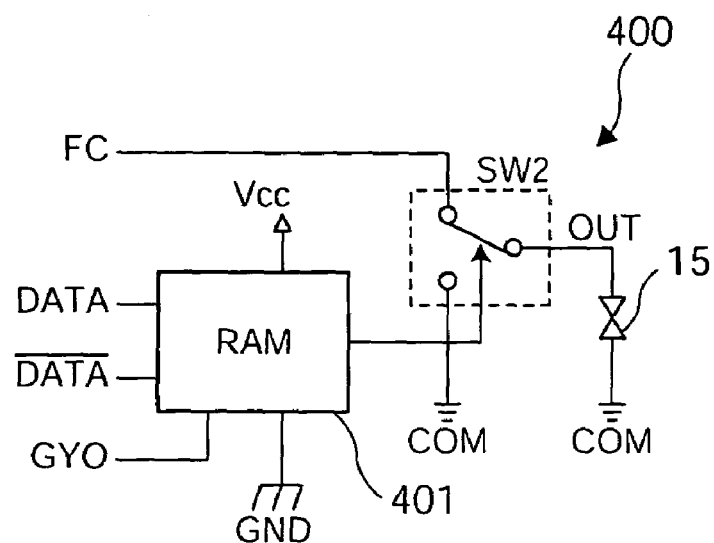
FIGS. 17A and 17B are schematics that illustrate a memory cell according to a second exemplary embodiment of the present invention.

FIG. 17A illustrates the schematic configuration of a memory cell 400 of an optoelectronic-device substrate according to a second exemplary embodiment of the present invention. The difference between the memory cell 101 of the first exemplary embodiment and the memory cell 400 of this exemplary embodiment is that the memory cell 101 has the two analog switches SW1 and SW2 while the memory cell 400 has the analog switch SW2 alone. The other configuration of the memory cell 400 is the same as that of the first exemplary embodiment, the same parts designated by the same reference numerals and the description thereof will be omitted. Further, since the configuration of the optoelectronic-device substrate is the same as that shown in FIG. 2, the description thereof is omitted. In this exemplary embodiment, the phase-inversion-signal shift driver 130 has the function of generating a data-inversion potential, based on the phase-inversion signal FC.

Figure 17B:
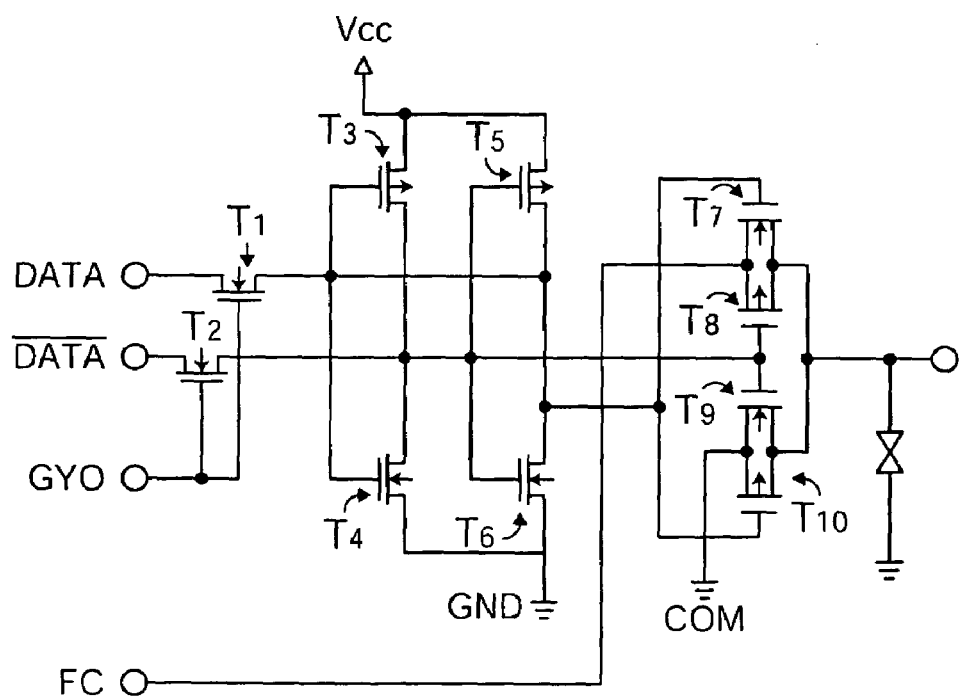

FIG. 17B shows the configuration of the memory cell 400 by illustrating the transistors thereof. Transistors T1 to T6 correspond to a storage unit 401 and transistors T7 to T10 correspond to the analog switch SW2. Thus, since the phase-inversion-signal shift driver 130 functions as the analog switch SW1, the number of transistors forming the pixel can be reduced. Consequently, the pixel size can be reduced.

(Third Exemplary Embodiment)

Figure 18:
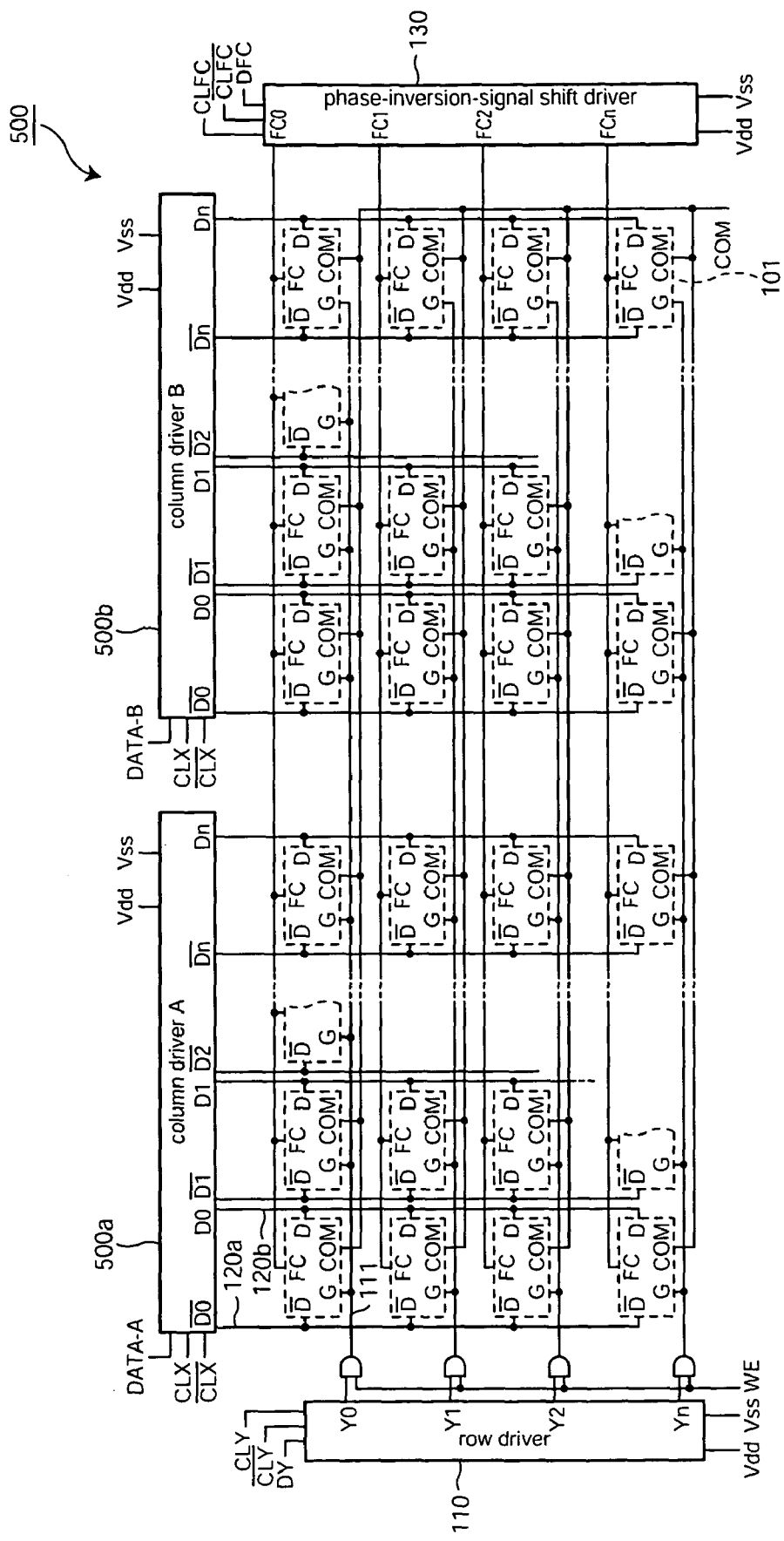
FIG. 18 is a schematic that shows an optoelectronic-device substrate according to a third exemplary embodiment of the present invention.

FIG. 18 shows the schematic configuration of an optoelectronic-device substrate according to a third embodiment of the present invention. This exemplary embodiment is different from the first embodiment in that two partial-column drivers 500a and 500b are provided. Since the other configuration is the same as that of the first exemplary embodiment, the same parts are designated by the same reference numerals and the description thereof omitted.

Since the above-described two partial-column drivers 500a and 500b are provided, it becomes possible to transmit data in parallel to the memory cells and reduce the quantity of data subjected to the serial-parallel conversion performed by the partial-column drivers. Subsequently, it becomes possible to display an image with high speed even though a large number of pixels are provided. Further, the number of the partial-column driver is not limited to two but can be three or more. Three partial-column drivers or more can handle pixels more than those in the above-described exemplary embodiments.

(Fourth Exemplary Embodiment)

Figure 21:
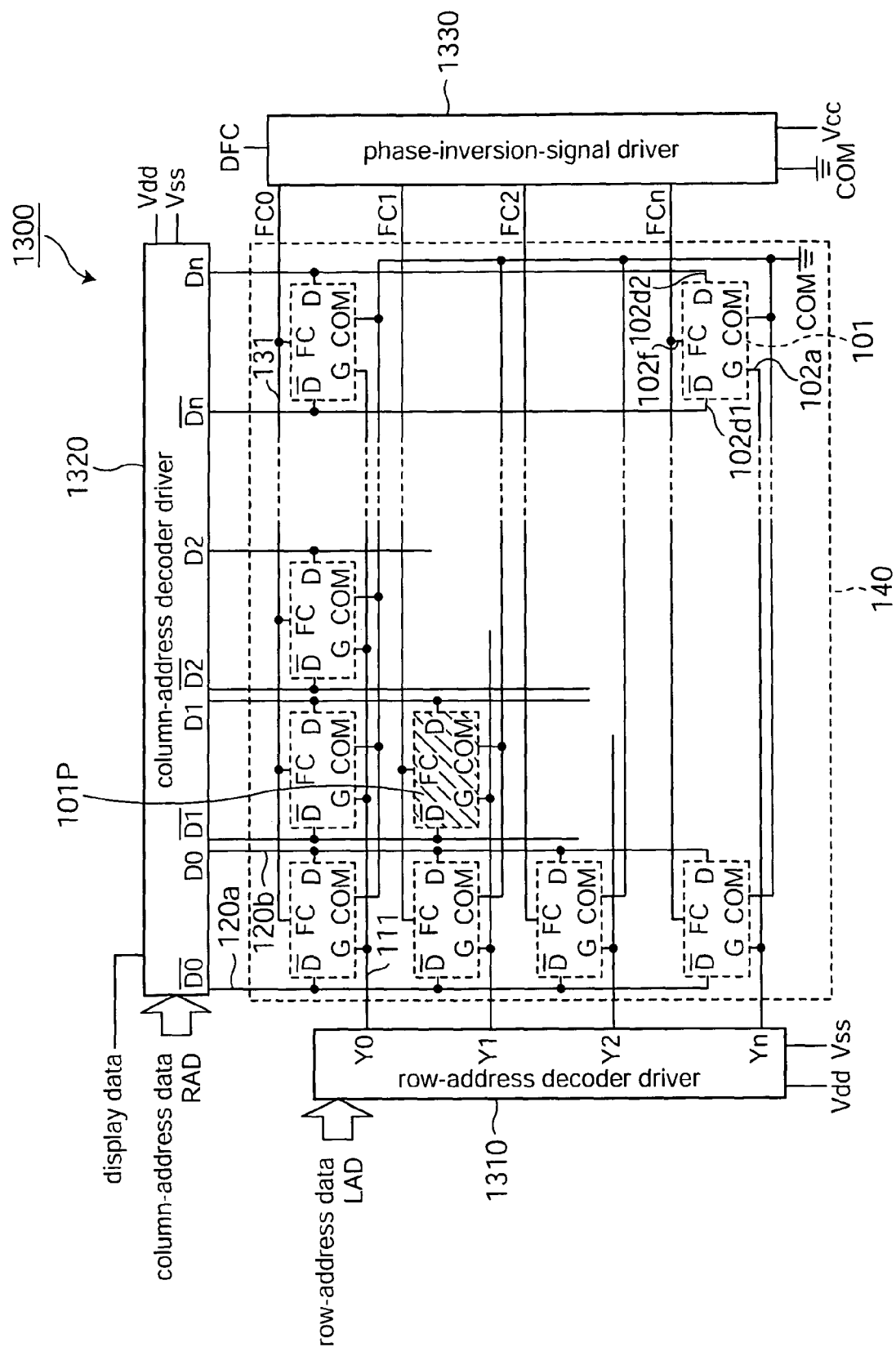
FIG. 21 is a schematic that shows an optoelectronic-device substrate according to a fourth exemplary embodiment of the present invention.

FIG. 21 illustrates the schematic configuration of an optoelectronic-device substrate according to a fourth exemplary embodiment of the present invention. This exemplary embodiment is different from the first exemplary embodiment in that a column-address decoder driver 1320 is provided in place of the column driver 120, a row-address decoder driver 1310 in place of the row driver 110, and a phase-inversion-signal driver 1330 in place of the phase-inversion-signal shift driver 130. Since the other configuration of this optoelectronic-device substrate is the same as that of the first exemplary embodiment, the same parts are designated by the same reference numeral and the description thereof is omitted.

A predetermined memory cell at an arbitrary address can be specified and selected by using row-address data RAD and column-address data CAD. The column-address decoder driver 1320 outputs pixel data that is to be stored in the selected address memory cell 101 from the data lines (the second signal lines) 120a and 120b.

For example, a method for rewriting pixel data stored in a diagonally-shaded memory cell 101P, the memory cell 101P being one of the plurality of memory cells 101 shown in FIG. 21, will now be considered. In this case, the row-address data RAD to select the address signal Y1 that is output is transmitted to the row-address decoder driver 1310. Further, the column-address data CAD for selecting an output D1 and pixel data to be written in the memory cell 101P are transmitted to a display-data terminal of the column-address decoder driver 1320 at the same time. In this manner, it becomes possible to rewrite the pixel data stored in the memory cell 101P that is arbitrarily selected from among the plurality of memory cells 101 on a random basis, irrespective of the arrangement of the memory cells 101. As a result, it becomes unnecessary to transfer pixel data to be displayed to memory cells 101 whose pixel data to be displayed needs not be rewritten. Subsequently, the power consumption required for the data-rewriting operation decreases.

Figure 22:
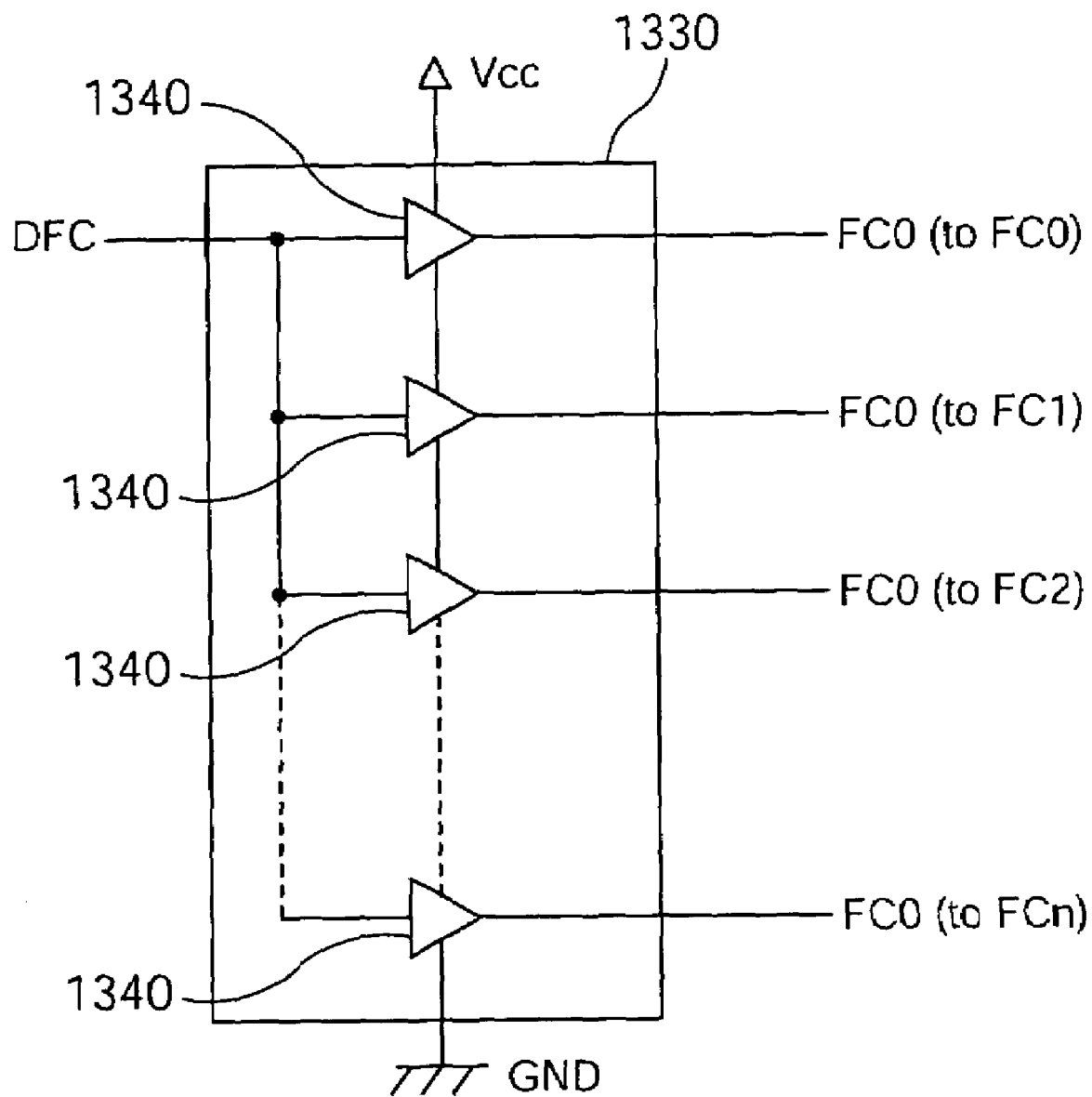
FIG. 22 is a schematic that shows a phase-inversion-signal driver according to the fourth exemplary embodiment.

FIG. 22 shows the schematic configuration of the phase-inversion-signal driver 1330. The phase-inversion-signal driver 1330 includes a plurality of buffer amplifiers 1340. Each buffer amplifier 1340 amplifies and generates a data-inversion potential according to the phase-inversion signal DFC (the data-inversion potential corresponding to the Vcc or GND potential shown in FIGS. 3A and 3B). The phase-inversion-signal driver 1330 transmits the generated data-inversion potential from outputs FC0 to FCn to all the memory cells 101. Subsequently, it becomes possible to invert the phase of the potential of a voltage applied on the liquid crystal, the voltage being output from the pixel electrode, regardless of all the quantity of rewriting the memory cells 101, that is, the number of memory cells 101 to be rewritten. Therefore, it becomes possible to perform operations to refresh display data applied on the liquid-crystal layer 15 (shown in FIG. 1). That is to say, it becomes possible to perform the phase-inversion process with cycles according to the liquid-crystal performance regardless of whether or not the display data is changed. Consequently, it becomes possible to reduce or prevent the image persistence on the liquid crystal by performing a reduced or minimum of the refreshing operations according to the performance of the liquid crystal. Further, it becomes possible to reduce the power requirements of an image-display device, such as a digitally-driven liquid-crystal display, an electronic apparatus, a projector, and so forth, the image-display device using the above-described optoelectronic-device substrate 1300.

(Fifth Exemplary Embodiment)

Figure 19:
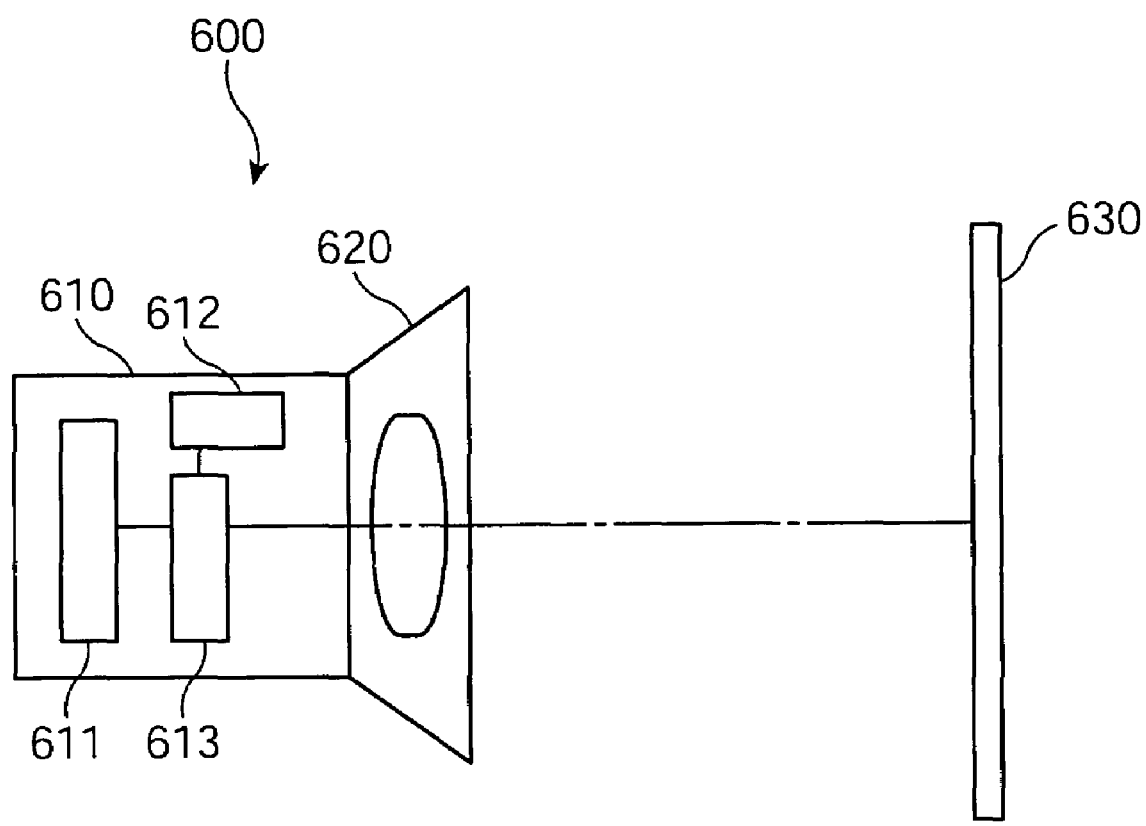
FIG. 19 is a schematic that shows a projector according to a fifth exemplary embodiment of the present invention.

FIG. 19 illustrates the schematic configuration of a projector 600 according to a fifth exemplary embodiment of the present invention. The projector 600 has a main unit 610 and a projection-lens system 620. The main unit 610 has a light-source unit 611 to supply light, a digitally-driven liquid-crystal display 613 including the optoelectronic-device substrate according to the above-described exemplary embodiments, and a control circuit 612 to control the digitally-driven liquid-crystal display 613. The projection-lens system 620 magnifies an image displayed on the digitally-driven liquid-crystal display 613 and projects the magnified image onto a screen 630. Since the projector 600 has the optoelectronic-device substrate according to the above-described embodiments, it becomes possible to project an image with high quality and high contrast according to a digital-driving method. Further, the power requirements of the projector 600 can be reduced.

(Sixth Embodiment)

Figure 20A:
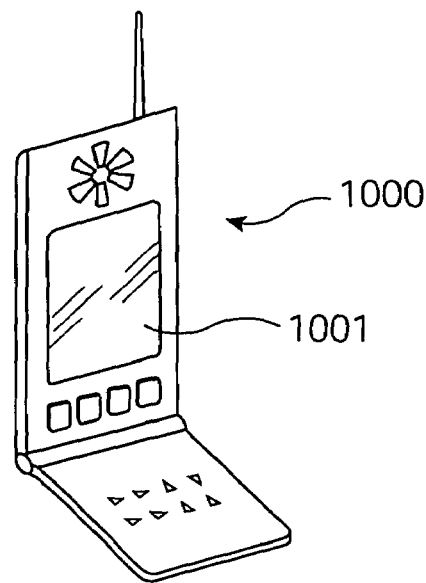
FIGS. 20A, 20B, and 20C are schematics of electronic apparatuses according to a sixth exemplary embodiment of the present invention.
Figure 20B:
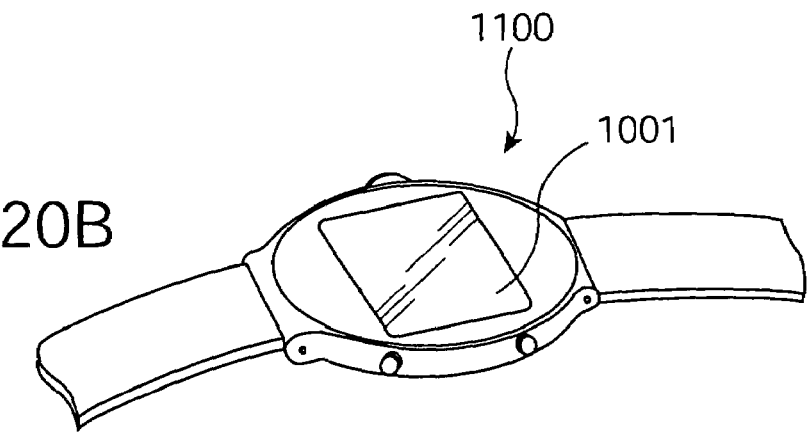
Figure 20C:
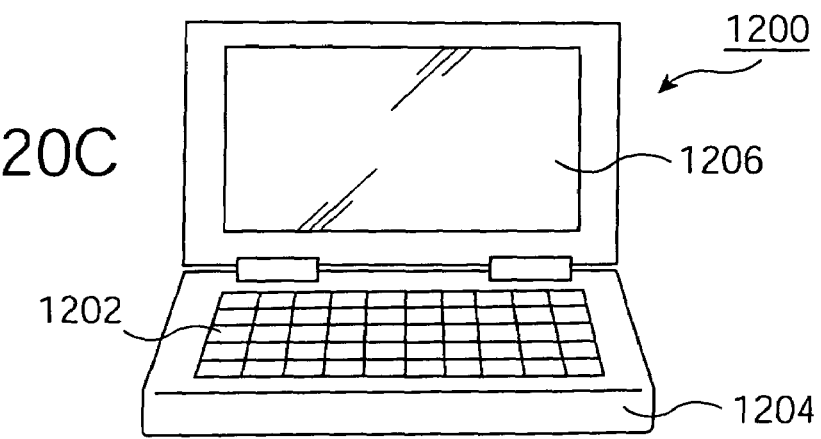

FIGS. 20A, 20B, and 20C show example electronic apparatuses according to a sixth embodiment of the present invention, respectively. FIG. 20A is a perspective view of a mobile phone 1000. The mobile phone 1000 has a liquid-crystal display 1001 using the optoelectronic-device substrate of the present invention. FIG. 20B is a perspective view of a wristwatch-type electronic apparatus 1100. The wristwatch-type electronic apparatus 1100 has a liquid-crystal device 1101 using the optoelectronic-device substrate of the present invention. FIG. 20C is a perspective view of an example mobile information-processing apparatus 1200 such as a word processor, a personal computer, and so forth. The mobile information-processing apparatus 1200 has an input unit 1202 such as a keyboard or the like, an information-processing device 1204, and a liquid-crystal display 1206 using the optoelectronic-device substrate of the present invention. Since each of these electronic apparatuses includes the optoelectronic-device substrate according to the above-described exemplary embodiments, it becomes possible to obtain an image with high quality and high contrast according to the digital-driving method. Further, the power requirements of these electronic apparatuses can be reduced. The present invention is not limited to the above-described exemplary embodiments but can be modified in various ways within the scope of the spirit thereof.

What is claimed is:

1. An optoelectronic-device substrate, comprising:
   a common electrode applied with a fixed potential;
   a pixel electrode;
   a storage unit for storing pixel data;
   a phase-inversion circuit that outputs a phase-inversion signal for inverting a phase of pixel data from the storage unit;
   a first switch that generates a data-inversion signal by switching between output of a ground voltage and a different voltage output from the storage unit in accordance with the phase-inversion signal, the data-inversion signal being a signal that inverts signal phase of display data between a positive potential and a negative potential; and
   a second switch for switching between the data-inversion signal from the first switch and a zero-data signal that indicates that a potential equivalent to the fixed potential applied to the common electrode should be applied to the pixel electrode, the second switch selecting the data-inversion signal when pixel data is stored in the storage unit, and the zero-data signal when pixel data is not stored in the storage unit, the selected one of the data-inversion signal and the zero-data signal being transmitted to the pixel electrode.

2. The optoelectronic-device substrate according to claim 1, the storage unit being formed as an SRAM.

3. The optoelectronic-device substrate according to claim 1, further comprising:
   a plurality of first signal lines to connect one group of address terminals included in one group of the storage units in parallel, the one group of the storage units being provided along a row direction;
   a plurality of second signal lines to connect one group of data terminals included in one group of the storage units in parallel, the one group of the storage units being provided along a column direction; and
   a plurality of third signal lines to connect one group of phase-inversion terminals included in one group of the storage units in parallel, the one group of the storage units being provided along the row direction or the column direction; and
   the optoelectronic-device substrate further including:
   a first driver circuit to transmit address signals in sequence to the storage units via the plurality of first signal lines, the storage units being provided along the row direction;
   a second driver circuit to transmit the pixel data to the storage units at one time via the plurality of second signal lines, the storage units being provided along the column direction; and
   a third driver circuit to transmit phase-inversion signals to each group of the storage units via the plurality of third signal lines, the group of the storage units being provided along the row direction or the column direction.

4. The optoelectronic-device substrate according to claim 2, a third driver circuit having a phase-inversion circuit to invert the phase of the pixel data, and the phase-inversion circuit inverting the phase of the pixel data before the pixel data is transmitted to the storage units.

5. The optoelectronic-device substrate according to claim 1, further comprising:
   a plurality of first signal lines to connect one group of address terminals included in one group of storage units in parallel, the one group of the storage units being provided along a row direction;
   a plurality of second signal lines to connect one group of data terminals included in one group of the storage units in parallel, the one group of the storage units being provided along a column direction; and
   a plurality of third signal lines to connect one group of phase-inversion terminals included in one group of the storage units in parallel, the one group of the storage units being provided along the row direction or the column direction; and
   the optoelectronic-device substrate further including:
   a row-address-decoder driver circuit to transmit row-address data for selecting any of rows of the storage units via the plurality of first signal lines, the storage units being provided along the row direction;
   a column-address-decoder driver circuit to transmit column-address data to select any of columns of the storage units via the plurality of second signal lines, the storage units being provided along the column direction, and the pixel data output to the storage units designated by the row-address data and the column-address data; and a phase-inversion driver circuit to transmit a phase-inversion signal to each group of the storage units via the plurality of third signal lines, the each group of the storage units being provided along the row direction or the column direction.

6. The optoelectronic-device substrate according to claim 5, the phase-inversion driver circuit having a phase-inversion circuit to invert the phase of the pixel data, the phase-inversion circuit inverting the phase of the pixel data in a predetermined cycle regardless of the number of the storage units whose display information is rewritten according to the pixel data.

7. A digitally-driven liquid-crystal display, comprising:
the optoelectronic-device substrate according to claim 1;
a counter substrate;
a liquid crystal layer provided between the optoelectronic device substrate and the counter substrate; and
a common electrode to supply a voltage having a potential that is equivalent to the potential of zero data transmitted to the optoelectronic-device substrate.

8. An electronic apparatus, comprising:
the digitally driven liquid crystal display according to claim 7; and
a display unit to display an image through the digitally-driven liquid-crystal display.

9. A projector, comprising:
a light-source unit to supply projection light;
the digitally-driven liquid-crystal display according to claim 7;
a control circuit to control the digitally-driven liquid-crystal display; and
a projection-lens system to magnify and project an image of the digitally-driven liquid-crystal display.

10. A method of driving an optoelectronic-device substrate that includes a storage unit array including a plurality of storage units that is arranged in matrix form along a row direction and a column direction and that is digitally driven, and a pixel electrode to retrieve pixel data stored in the storage units as an electrical signal, the method comprising:

performing at least one of inverting a phase of the pixel data before the pixel data is transmitted to the storage units, and inverting the phase of the pixel data after the pixel data is transmitted to the storage units, the performing comprising:

providing a common electrode applied with a fixed potential;

providing a phase-inversion signal for inverting the phase of pixel data from the storage unit;

generating a data-inversion signal by switching between output of a ground voltage and a different voltage output from the storage unit in accordance with the phase-inversion signal, the data-inversion signal being a signal that inverts signal phase of display data between a positive potential and a negative potential;

selecting the data-inversion signal when pixel data is stored in the storage unit, and selecting a zero-data signal when pixel data is not stored in the storage unit, the zero-data signal indicating that a potential equivalent to the fixed potential applied to the common electrode should be applied to the pixel electrode; and transmitting the selected signal to the pixel electrode.

11. The method of driving an optoelectronic-device substrate according to claim 10, the performing including selecting the memory cells provided along the row direction in sequence, and inverting the phase of the pixel data at the same time.

12. The method for driving an optoelectronic-device substrate according to claim 11, the performing including transmitting a cycle with which the phase-inversion signal to the storage units provided along the row direction, and making a cycle with which the pixel data is transmitted to the storage units provided along the row direction variable so that the cycles can change in synchronization, whereby a cycle of sub-frames is made variable so as to present gray scale.

* * * * *